US012736890B2

(12) United States Patent
Tamura et al.

(10) Patent No.: US 12,736,890 B2
(45) Date of Patent: Sep. 15, 2026

(54) TONER

(71) Applicant: CANON KABUSHIKI KAISHA, Tokyo (JP)

(72) Inventors: Junichi Tamura, Ibaraki (JP); Yosuke Iwasaki, Chiba (JP); Takeshi Ohtsu, Ibaraki (JP); Ryuji Okamura, Ibaraki (JP); Daisuke Yamashita, Chiba (JP); Koh Ishigami, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 617 days.

(21) Appl. No.: 18/316,012

(22) Filed: May 11, 2023

(65) Prior Publication Data

US 2023/0375953 A1 Nov. 23, 2023

(30) Foreign Application Priority Data

May 20, 2022 (JP) ................................ 2022-082700
Mar. 10, 2023 (JP) ................................ 2023-037322

(51) Int. Cl.
*G03G 9/08* (2006.01)
*G03G 9/097* (2006.01)

(52) U.S. Cl.
CPC ....... *G03G 9/09708* (2013.01); *G03G 9/0821* (2013.01)

(58) Field of Classification Search
CPC ......................... G03G 9/09708; G03G 9/0821
See application file for complete search history.

(56) References Cited

U.S. PATENT DOCUMENTS

| | | | |
|---|---|---|---|
| 7,279,262 | B2 | 10/2007 | Fujikawa |
| 7,396,626 | B2 | 7/2008 | Fujikawa |
| 7,396,629 | B2 | 7/2008 | Baba |
| 7,611,813 | B2 | 11/2009 | Ida |
| 7,629,100 | B2 | 12/2009 | Okamoto |

(Continued)

FOREIGN PATENT DOCUMENTS

| | | | |
|---|---|---|---|
| JP | H0643694 A | * | 2/1994 |
| JP | 2001209207 A | * | 8/2001 |

(Continued)

OTHER PUBLICATIONS

JP-2002049175-A Translation (Year: 2025).*
JP-H0643694-A Translation (Year: 2025).*
JP-2001209207-A Translation (Year: 2026).*

*Primary Examiner* — Mark F. Huff
*Assistant Examiner* — Charles Collins Sullivan, IV
(74) *Attorney, Agent, or Firm* — VENABLE LLP

(57) ABSTRACT

Provided is a toner that expresses all of low-temperature fixability, transferability, and scratch resistance at high levels. The toner is a toner including a toner particle containing a binder resin, a wax, and an inorganic fine particle, wherein when an outflow start temperature measured with the toner is represented by T1 (° C.), the inorganic fine particle always has a thermal expansion coefficient of $-0.1\times10^{-6}$ (/K) or less in a temperature range of from 30° C. or more to T1° C. or less, the thermal expansion coefficient being determined by X-ray diffraction and wherein a content of the wax is 3.0 mass % or more and 20.0 mass % or less with respect to a mass of the toner particle.

2 Claims, 1 Drawing Sheet

(56) References Cited

U.S. PATENT DOCUMENTS

| | | | |
|---|---|---|---|
| 7,767,370 | B2 | 8/2010 | Ishigami |
| 7,858,283 | B2 | 12/2010 | Ishigami |
| 7,906,262 | B2 | 3/2011 | Ishigami |
| 7,927,775 | B2 | 4/2011 | Komatsu |
| 7,939,233 | B2 | 5/2011 | Inoue |
| 8,114,562 | B2 | 2/2012 | Ishigami |
| 8,137,886 | B2 | 3/2012 | Baba |
| 8,288,069 | B2 | 10/2012 | Fujikawa |
| 8,298,742 | B2 | 10/2012 | Okamoto |
| 8,323,726 | B2 | 12/2012 | Naka |
| 8,921,023 | B2 | 12/2014 | Baba |
| 8,927,188 | B2 | 1/2015 | Naka |
| 8,945,805 | B2 | 2/2015 | Baba |
| 8,974,994 | B2 | 3/2015 | Kamae |
| 8,986,914 | B2 | 3/2015 | Fujikawa |
| 9,034,551 | B2 | 5/2015 | Endo |
| 9,057,970 | B2 | 6/2015 | Ida |
| 9,058,924 | B2 | 6/2015 | Komatsu |
| 9,063,443 | B2 | 6/2015 | Ishigami |
| 9,075,328 | B2 | 7/2015 | Minagawa |
| 9,152,088 | B1 | 10/2015 | Kobori |
| 9,348,247 | B2 | 5/2016 | Ida |
| 9,372,420 | B2 | 6/2016 | Mizo |
| 9,417,540 | B2 | 8/2016 | Hashimoto |
| 9,436,112 | B2 | 9/2016 | Iwasaki |
| 9,540,483 | B2 | 1/2017 | Ida |
| 9,665,021 | B2 | 5/2017 | Ohtsu |
| 9,665,023 | B2 | 5/2017 | Kamae |
| 9,665,026 | B2 | 5/2017 | Iwasaki |
| 9,671,707 | B2 | 6/2017 | Minagawa |
| 9,696,644 | B2 | 7/2017 | Ida |
| 9,897,934 | B2 | 2/2018 | Tamura |
| 9,915,885 | B2 | 3/2018 | Katsumata |
| 9,969,834 | B2 | 5/2018 | Ohtsu |
| 10,012,918 | B2 | 7/2018 | Ishigami |
| 10,012,920 | B2 | 7/2018 | Shibata |
| 10,012,921 | B2 | 7/2018 | Kamae |
| 10,078,281 | B2 | 9/2018 | Ida |
| 10,088,765 | B2 | 10/2018 | Miyakal |
| 10,133,201 | B2 | 11/2018 | Kamae |
| 10,203,619 | B2 | 2/2019 | Yamashita |
| 10,216,108 | B2 | 2/2019 | Iwasaki |
| 10,228,629 | B2 | 3/2019 | Tamura |
| 10,234,777 | B2 | 3/2019 | Ohtsu |
| 10,353,312 | B2 | 7/2019 | Kamae |
| 10,423,090 | B2 | 9/2019 | Ohtsu |
| 10,451,990 | B2 | 10/2019 | Kamae |
| 10,514,624 | B2 | 12/2019 | Tamura |
| 10,642,178 | B2 | 5/2020 | Yamashita |
| 10,775,710 | B1 | 9/2020 | Kamae |
| 10,859,935 | B2 | 12/2020 | Ohtsu |
| 10,877,386 | B2 | 12/2020 | Murayama |
| 11,131,938 | B2 | 9/2021 | Murayama |
| 11,429,032 | B2 | 8/2022 | Shibata |
| 11,675,283 | B2 | 6/2023 | Kamae |
| 11,698,594 | B2 | 7/2023 | Takahashi |
| 2010/0216066 | A1 | 8/2010 | Kadokura |
| 2013/0171556 | A1* | 7/2013 | Fujikawa ............... G03G 9/081 430/109.4 |
| 2021/0026265 | A1* | 1/2021 | Kamikura .......... G03G 9/09791 |
| 2021/0055668 | A1 | 2/2021 | Tamura |
| 2021/0278774 | A1 | 9/2021 | Hashimoto |
| 2021/0278775 | A1 | 9/2021 | Kamae |
| 2021/0286282 | A1 | 9/2021 | Kobori |
| 2021/0302853 | A1 | 9/2021 | Murata |
| 2021/0302854 | A1 | 9/2021 | Kitamura |
| 2021/0397106 | A1 | 12/2021 | Kobori |
| 2022/0050398 | A1 | 2/2022 | Ooyama |
| 2022/0197163 | A1 | 6/2022 | Kajihara |
| 2022/0252995 | A1 | 8/2022 | Tsujimoto |

FOREIGN PATENT DOCUMENTS

| | | | | |
|---|---|---|---|---|
| JP | 2002049175 | A | * | 2/2002 |
| JP | 2010-191355 | A | | 9/2010 |
| JP | 2011-70002 | A | | 4/2011 |

* cited by examiner

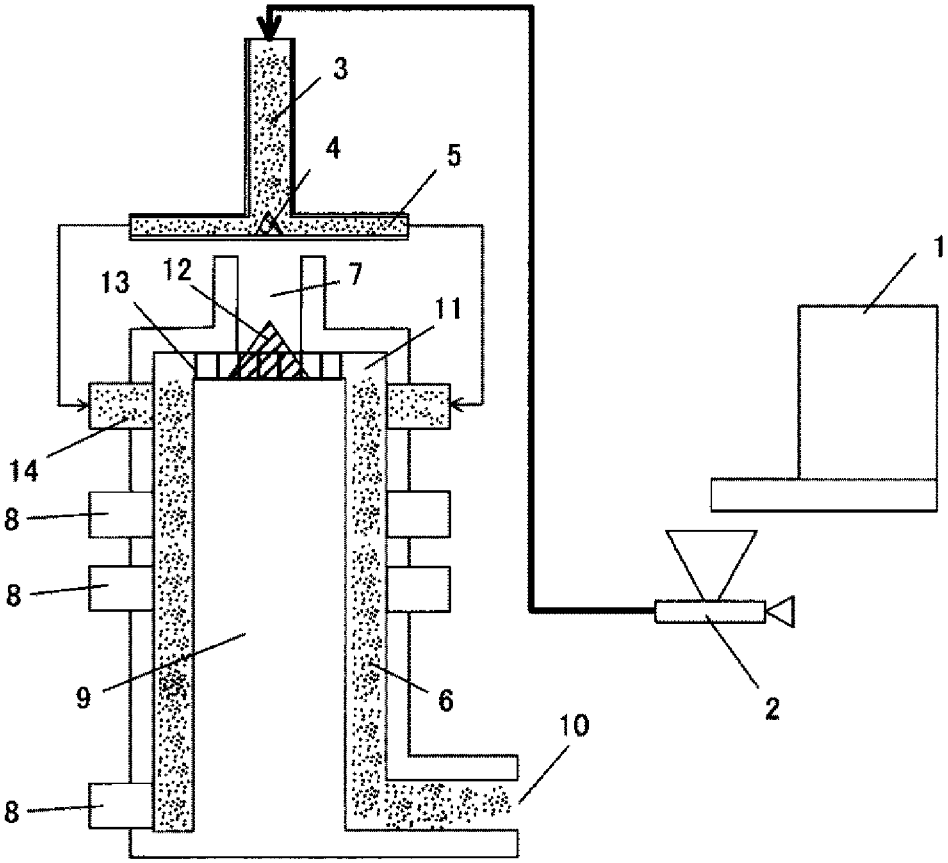
1
2
3
4
5
6
7
8
8
8
9
10
11
12
13
14

TONER

BACKGROUND OF THE INVENTION

Field of the Invention

The present invention relates to a toner to be used in an electrophotographic system, an electrostatic recording system, or an electrostatic printing system.

Description of the Related Art

In recent years, along with an increasingly widespread use of an electrophotographic full-color copying machine, there have been rising demands for an increase in speed of printing and energy saving measures. To adapt to high-speed printing, a technology for more quickly melting a toner in a fixing process has been investigated. In addition, in order to reduce power consumption in the fixing process as an energy saving measure, a technology for fixing toner at a lower temperature has been investigated.

To adapt to high-speed printing and to improve the low-temperature fixability of the toner, the following method has been used: the glass transition point and softening point of the binder resin of the toner are reduced, and a binder resin having a sharp melt property is used. However, the toner improved in low-temperature fixability has a low internal aggregating force, and hence has involved problems, such as the offset of the toner due to rubbing between the sheets of paper subjected to printing and a reduction in scratch resistance thereof.

To solve the above-mentioned problems, in Japanese Patent Application Laid-Open No. 2010-191355, there is a proposal of the hardening of a toner-fixed product through an increase in molecular weight of a binder for a toner. In addition, in Japanese Patent Application Laid-Open No. 2011-70002, there is a proposal of a reduction in surface friction coefficient of a toner-fixed product through an increase in amount of a wax in a toner or the facilitation of its exudation.

However, it has been found that although the toner described in Japanese Patent Application Laid-Open No. 2010-191355 is improved in scratch resistance, the hardening of the toner deteriorates the low-temperature fixability thereof or deteriorates the pulverization property thereof in a melt-kneading pulverization method.

In addition, it has been found that although the toner described in Japanese Patent Application Laid-Open No. 2011-70002 is improved in scratch resistance, the amount of the wax on the surface of the toner increases to cause the charging unevenness of the surface of the toner, and hence an adhesive force between the particles of the toner becomes stronger to deteriorate the transferability thereof.

SUMMARY OF THE INVENTION

An object of the present invention is to obtain a toner that expresses all of low-temperature fixability, transferability, and scratch resistance at high levels.

The inventors of the present invention have made extensive investigations, and as a result, have found that the internal addition of a negatively thermally expansive material having a thermal expansion coefficient of $-0.1\times10^{-6}$ (/K) or less to a toner particle provides a toner that achieves all of low-temperature fixability, transferability, and scratch resistance.

That is, the present invention relates to a toner including a toner particle containing a binder resin, a wax, and an inorganic fine particle, wherein when an outflow start temperature measured with the toner is represented by T1 (° C.), the inorganic fine particle always has a thermal expansion coefficient of $-0.1\times10^{-6}$ (/K) or less in a temperature range of from 30° C. or more to T1° C. or less, the thermal expansion coefficient being determined by X-ray diffraction, and wherein a content of the wax is 3.0 mass % or more and 20.0 mass % or less with respect to a mass of the toner particle.

Further features of the present invention will become apparent from the following description of exemplary embodiments with reference to the attached drawing.

BRIEF DESCRIPTION OF THE DRAWINGS

FIGURE is a schematic view of an apparatus suitable for the heat treatment of a resin particle serving as a toner particle.

DESCRIPTION OF THE EMBODIMENTS

In the present invention, the description "○○ or more and xx or less" or "from ○○ to xx" representing a numerical range means a numerical range including a lower limit and an upper limit that are end points unless otherwise stated.

A mode for carrying out the present invention is described in detail below.

A toner of the present invention is a toner including a toner particle containing a binder resin, a wax, and an inorganic fine particle, wherein when an outflow start temperature measured with the toner is represented by T1 (° C.), the inorganic fine particle always has a thermal expansion coefficient of $-0.1\times10^{-6}$ (/K) or less in a temperature range of from 30° C. or more to T1° C. or less, the thermal expansion coefficient being determined by X-ray diffraction, and wherein a content of the wax is 3.0 mass % or more and 20.0 mass % or less with respect to a mass of the toner particle.

The above-mentioned toner has excellent characteristics in terms of low-temperature fixability, transferability, and scratch resistance.

The inventors of the present invention conceive the mechanism to be as described below.

In the case where a negatively thermally expansive material is internally added to the toner particle, when the toner is heated at the time of its fixation, the volume of the negatively thermally expansive material shrinks to further collapse the entirety of the toner. Probably because of the foregoing, the wax that has been unable to exude to the surface layer of the toner to which the negatively thermally expansive material is not added can exude. In addition, the volume of the negatively thermally expansive material may return at the time of the return thereof to normal temperature after the fixation to enable the suppression of the sharpening of the angle of a toner end portion due to the shrinkage of the fixed toner. Accordingly, the amount of the wax on the surface of the toner increases to reduce the friction coefficient of the surface of an image, and the suppression of the sharpening of the angle of the toner end portion reduces the hang-up of the image at the time of its rubbing. Probably as a result of the foregoing, the scratch resistance of the toner is improved. Further, not the external addition of the negatively thermally expansive material but the internal addition thereof may enable the exudation of the wax and the suppression of the shrinkage even in an image portion where the toner particles hardly overlap each other such as a halftone image. In addition, in the toner before the fixation, there is no need to increase the amount of the wax on the surface, and hence no reduction in transferability of the toner may occur. There is also no need to harden the binder resin, and hence no reduction in low-temperature fixability of the toner may occur.

The constituent materials for the toner are described below.

[Inorganic Fine Particle Having Thermal Expansion Coefficient (Linear Expansion Coefficient) of $-0.1\times10^{-6}$ (/K) or Less]

When the outflow start temperature measured with the toner is represented by T1 (° C.), the thermal expansion coefficient of the inorganic fine particle determined by the X-ray diffraction needs to be always $-0.1\times10^{-6}$ (/K) or less in the temperature range of from 30° C. or more to T1° C. or less. The inorganic fine particle is not particularly limited as long as the fine particle has a thermal expansion coefficient in the range, and a known material may be used. When the coefficient falls within the range, the exudation of the wax at the time of the fixation of the toner is accelerated, and the shrinkage of the toner after the fixation is suppressed to suppress the sharpening of the angle of the end portion thereof. Thus, the scratch resistance thereof is improved. The outflow start temperature measured with the toner reflects the outflow start temperature of the binder resin.

From the viewpoint of improving the scratch resistance, the thermal expansion coefficient of the inorganic fine particle is preferably $-0.2\times10^{-6}$ (/K) or less, more preferably $-1.0\times10^{-6}$ (/K) or less.

The inorganic fine particle is, for example, a particle showing negative thermal expansivity in the range of from 30° C. to the outflow start temperature of a general toner (binder resin), such as a zirconium tungstate particle, a zirconium phosphate tungstate particle, a zirconium phosphate particle, zeolite, or crystallized glass, and one kind of the particles may be used, or a plurality of kinds thereof may be used.

The inorganic fine particle preferably includes the zirconium phosphate tungstate particle or the zirconium phosphate particle out of those particles, and is more preferably the zirconium phosphate tungstate particle or the zirconium phosphate particle. The zirconium phosphate tungstate particle or the zirconium phosphate particle is preferred because such particle has relatively high negative thermal expansivity, and can produce a sharp particle diameter distribution when internally added to the toner.

The number-average particle diameter of the inorganic fine particle is preferably 0.1 μm or more and 3.0 μm or less, more preferably 0.5 μm or more and 2.0 μm or less. In addition, in the particle size distribution thereof, the peak top of a number frequency preferably falls within the particle diameter ranges. When the number-average particle diameter falls within the ranges, the exudation of the wax at the time of the fixation of the toner is easily accelerated, and the tinge thereof is not inhibited.

The content of the inorganic fine particle in the toner particle is preferably 1.0 vol % or more and 10.0 vol % or less with respect to the toner particle. A content of 1.0 vol % or more is preferred because the exudation of the wax at the time of the fixation becomes satisfactory, and a content of 10.0 vol % or less is preferred because the tinge is not inhibited. From the viewpoints of the exudation of the wax and the tinge, the content is preferably 1.0 vol % or more and 10.0 vol % or less, more preferably 4.0 vol % or more and 8.0 vol % or less.

Although a method of producing the inorganic fine particle is not particularly limited, a wet method is preferred because a desired particle diameter is easily obtained and a uniform crystal structure is obtained.

The inorganic fine particle needs to be separated from the toner at the time of the measurement of the thermal expansion coefficient of the inorganic fine particle. A method for the separation is not limited, but is, for example, the following method.

The toner is dissolved in toluene heated to 60° C., and the solution is sufficiently stirred, followed by the sedimentation of insoluble matter with a centrifugal separator. The supernatant is disposed of, and the sediment sufficiently washed with toluene is recovered.

Although the sediment contains an external additive, a pigment, or the like in addition to the target inorganic fine particle, even the thermal expansion coefficient of a mixture can be measured by identifying the inorganic fine particle, the external additive, the pigment, or the like through the observation of a section of the toner with a scanning electron microscope (SEM) and an energy dispersive X-ray analyzer (EDS) as long as a peak derived from a crystal observed with an X-ray diffractometer (XRD) for measuring the thermal expansion coefficient does not overlap the peak of the external additive, the pigment, or the like.

If the peak of the external additive overlaps the peak derived from the crystal, a surfactant is added to sucrose water obtained by mixing pure water and sucrose powder at 1:2, and the toner is added thereto in an amount of about 2 parts by mass with respect to 100 parts by mass of the sucrose water, followed by sufficient stirring. After that, the external additive is liberated with an ultrasonic cleaning machine, and is subjected to a centrifugal separator. Thus, the external additive is sedimented, and hence the toner particle from which the external additive has been liberated can be recovered as a film on a liquid surface. The film is redispersed in pure water, and the resultant is filtered and washed, followed by drying. Thus, the toner particle from which the external additive has been removed is obtained.

[Binder Resin]

The toner particle contains the binder resin. The binder resin is not particularly limited, and a known polymer typically used in a toner may be appropriately selected in accordance with purposes. Although an amorphous resin is preferably used as a main binder, a crystalline resin may be used in combination for improving the low-temperature fixability of the toner.

The content of the amorphous resin in the binder resin is preferably 50 mass % or more and 100 mass % or less, more preferably 80 mass % or more and 100 mass % or less, still more preferably 90 mass % or more and 100 mass % or less.

[Amorphous Resin]

The amorphous resin is not particularly limited, and specifically, the following polymers may each be used:

homopolymers of styrene and substituted products thereof, such as polystyrene, poly-p-chlorostyrene, and polyvinyltoluene; styrene-based copolymers, such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-methyl α-chloromethacrylate copolymer, a styrene-acrylonitrile copolymer, a styrene-vinyl methyl ether copolymer, a styrene-vinyl ethyl ether copolymer, a styrene-vinyl methyl ketone copolymer, and a styrene-acrylonitrile-indene copolymer; and polyvinyl chloride, a phenol resin, a natural resin-modified phenol resin, a natural resin-modified maleic acid resin, an acrylic resin, a methacrylic resin, polyvinyl acetate, a silicone resin, a polyester resin, a polyurethane resin, a polyamide resin, a furan resin, an epoxy resin, a xylene resin, a polyvinylbutyral resin, a terpene resin, a coumarone-indene resin, and a petroleum-based resin.

The binder resin preferably contains a polyester resin, and is more preferably the polyester resin. Although an example of a case in which the polyester resin is selected as the binder resin is described in detail below, the binder resin is not limited to the polyester resin.

The polyester resin is preferably an amorphous polyester resin. The polyester resin, which is not particularly limited, is, for example, a resin obtained by subjecting an alcohol component and a carboxylic acid component to condensation polymerization.

Specific examples of the alcohol component include the following components:

alkylene oxide adducts of bisphenol A, such as polyoxypropylene(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane; ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene; and derivatives thereof. The derivatives are not particularly limited as long as the same resin structure is obtained by the condensation polymerization. Examples thereof include derivatives obtained by esterifying the alcohol components.

Meanwhile, examples of the carboxylic acid component include the following components:

aromatic dicarboxylic acids, such as phthalic acid, isophthalic acid, and terephthalic acid, or anhydrides thereof; alkyldicarboxylic acids, such as succinic acid, adipic acid, sebacic acid, and azelaic acid, or anhydrides thereof; succinic acid substituted with an alkyl group or alkenyl group having 6 to 18 carbon atoms or anhydrides thereof; unsaturated dicarboxylic acids, such as fumaric acid, maleic acid, and citraconic acid, or anhydrides thereof; polyvalent carboxylic acids, such as trimellitic acid, pyromellitic acid, and benzophenonetetracarboxylic acid, or anhydrides thereof; and derivatives thereof. The derivatives are not particularly limited as long as the same resin structure is obtained by the condensation polymerization. Examples thereof include derivatives obtained by subjecting the carboxylic acid components to methyl esterification, ethyl esterification, or acid chlorination.

A suitable example of the amorphous polyester resin is a resin obtained by subjecting an alcohol component, which contains a compound selected from the group consisting of: a bisphenol represented by the following formula (2); and a derivative thereof, and a carboxylic acid component, which contains a compound (e.g., fumaric acid, maleic acid, maleic anhydride, phthalic acid, terephthalic acid, trimellitic acid, or pyromellitic acid) selected from the group consisting of: a carboxylic acid that is divalent or more; and a derivative thereof, to condensation polymerization.

Formula (2)

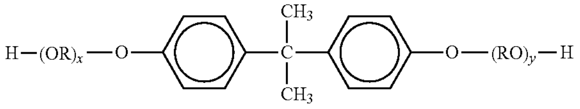

In the formula, R represents an ethylene group or a propylene group, "x" and "y" each represent an integer of 1 or more, and the average of x+y is 2 or more and 6 or less.

Further, a resin obtained as follows is given as an example thereof: an alcohol component in which R represents $—CH_2—CH(CH_3)—$ out of the bisphenol represented by the formula (2) and the derivative thereof, and a carboxylic acid component, which contains a compound (e.g., isophthalic acid or terephthalic acid) selected from the group consisting of: an aromatic dicarboxylic acid; and a derivative thereof, are subjected to condensation polymerization.

In addition, the content of the alcohol component in which R represents $—CH_2—CH(CH_3)—$ out of the bisphenol represented by the formula (2) and the derivative thereof is preferably 50 mol % or more and 100 mol % or less, more preferably 90 mol % or more and 100 mol % or less in terms of total amount in the alcohol component.

Further, the content of the amorphous polyester resin in the amorphous resin is preferably 25 mass % or more and 100 mass % or less, more preferably 50 mass % or more and 100 mass % or less.

From the viewpoint of charging stability, the acid value of the amorphous polyester resin is preferably 1 mgKOH/g or more and 10 mgKOH/g or less.

In addition, the amorphous polyester resin preferably contains amorphous polyester A having a low softening point and amorphous polyester B having a high softening point in terms of achievement of both the low-temperature fixability and separability of the toner.

The content ratio (AB) of the amorphous polyester A having a low softening point to the amorphous polyester B having a high softening point is preferably from 60/40 to 90/10 on a mass basis from the viewpoints of the low-temperature fixability and the separability.

The softening point of the amorphous polyester A having a low softening point is preferably 70° C. or more and 100° C. or less from the viewpoint of the achievement of both the storage stability and low-temperature fixability of the toner.

The softening point of the amorphous polyester B having a high softening point is preferably 110° C. or more and 180° C. or less from the viewpoint of the hot offset resistance of the toner.

[Wax]

The toner particle contains the wax. Examples of the wax include the following waxes:

a hydrocarbon-based wax, such as low-molecular-weight polyethylene, low-molecular-weight polypropylene, an alkylene copolymer, a microcrystalline wax, a paraffin wax, or a Fischer-Tropsch wax; an oxidized product of a hydrocarbon-based wax such as an oxidized polyethylene wax, or a block copolymerization product thereof; a wax containing a fatty acid ester as a main component such as a carnauba wax; and a wax obtained by subjecting part or all of a fatty acid ester to deacidification such as a deacidified carnauba wax.

Further examples thereof include: a saturated straight-chain fatty acid, such as palmitic acid, stearic acid, or montanic acid; an unsaturated fatty acid, such as brassidic acid, eleostearic acid, or parinaric acid; a saturated alcohol, such as stearyl alcohol, aralkyl alcohol, behenyl alcohol, carnaubyl alcohol, ceryl alcohol, or melissyl alcohol; a polyhydric alcohol such as sorbitol; an ester formed of a fatty acid, such as palmitic acid, stearic acid, behenic acid, or montanic acid, and an alcohol, such as stearyl alcohol, aralkyl alcohol, behenyl alcohol, carnaubyl alcohol, ceryl alcohol, or melissyl alcohol; a fatty acid amide, such as linoleamide, oleamide, or lauramide; a saturated fatty acid bisamide, such as methylenebisstearamide, ethylenebiscapramide, ethylenebislauramide, or hexamethylenebisstearamide; an unsaturated fatty acid amide, such as ethylenebisoleamide, hexamethylenebisoleamide, N,N'-dioleyladipamide, or N,N'-dioleylsebacamide; an aromatic bisamide, such as m-xylenebisstearamide or N,N'-distearylisophthalamide; an aliphatic metal salt, such as calcium stearate, calcium laurate, zinc stearate, or magnesium stearate (generally referred to as "metal soap"); a wax obtained by grafting an aliphatic hydrocarbon-based wax with a vinyl-based monomer, such as styrene or acrylic acid; a partially esterified product formed of a fatty acid and a polyhydric alcohol such as behenic acid monoglyceride; and a methyl ester compound having a hydroxyl group obtained by subjecting a vegetable oil and fat to hydrogenation.

Of those waxes, a hydrocarbon-based wax, such as a paraffin wax or a Fischer-Tropsch wax, or a fatty acid ester-based wax such as a carnauba wax is preferred from the viewpoint of improving the low-temperature fixability, hot offset resistance, and scratch resistance of the toner.

The content of the wax is 3.0 mass % or more and 20.0 mass % or less with respect to the mass of the toner particle (3.0 parts by mass or more and 20.0 parts by mass or less with respect to 100 parts by mass of the toner particle). When the content of the wax falls within the range, the wax exudes to the surface of a fixed image to provide scratch resistance, and hence fixation separability at high temperatures is efficiently exhibited with ease. When the content does not exceed the range, an increase in amount of the wax on the surface of the toner is suppressed to suppress the non-uniformization of the charging of the surface of the toner. Thus, the adhesive force of the toner is suppressed, and hence the transferability thereof can be maintained.

In addition, from the viewpoint of the achievement of all of the storage stability of the toner, the fixation separability thereof at high temperatures, and the scratch resistance thereof, the peak temperature of the maximum endothermic peak of the wax present in the temperature range of from 30° C. or more to 200° C. or less in an endothermic curve at the time of a temperature increase measured with a differential scanning calorimeter (DSC) is preferably 50° C. or more and 110° C. or less.

Further, with regard to the state of presence of the wax in the toner particle, in the observation of a section of the toner with a transmission electron microscope, the ratio of the area proportion Ws of the wax in a surface layer region, the surface layer region being defined as a region from the surface of the toner particle to a depth of 500 nm, to the area proportion Wi of the wax in a region inside the depth of 500 nm preferably satisfies the following formula (1) because both of the scratch resistance and the transferability can be achieved.

$$2.0 \geq Ws/Wi \geq 1.0 \qquad \text{Formula (1)}$$

The distribution state of the wax in the toner is evaluated as follows: a section of the toner particle is observed with a transmission electron microscope (TEM); the area proportions Ws and Wi are calculated from the sectional areas of domains formed by the wax; and the averages of the area proportions of 100 toner particles that have been arbitrarily selected are used in the evaluation.

More specifically, the toner is embedded with a visible light-curable embedding resin (D-800, manufactured by Nisshin-EM), and the resultant is cut into a thickness of 60 nm with an ultrasonic ultramicrotome (EM5, manufactured by Leica), followed by Ru staining with a vacuum staining apparatus (manufactured by Filgen, Inc.). After that, the stained product is observed with a transmission electron microscope (H-7500, manufactured by Hitachi, Ltd.) at an acceleration voltage of 120 kV. 100 Particles each having a particle diameter within the range of the weight-average particle diameter of the toner plus and minus 2.0 μm are selected as toner particles whose sections are to be observed, and the images of their sections are taken. Image processing software (Photoshop 5.0, manufactured by Adobe Inc.) is used for each of the resultant images to clarify distinction between the wax domains and the region of the binder resin. More specifically, the wax domains can be distinguished from the region as described below. The captured TEM images are binarized with the image processing software by setting the threshold of brightness (maximum gray level: 255) to 160. At this time, the wax of the toner and the photocurable resin D-800 each serve as a light portion, and the portion of the toner except the wax serves as a dark portion. The contour of the toner can be identified by a contrast between the toner and the photocurable resin.

Masking is performed in a section of the toner particle while a surface layer region from the surface of the toner particle (the contour of the section) to a depth of 500 nm (including a boundary at the depth of 500 nm) is left. More specifically, a line is drawn from the center of gravity of the section of the toner particle to a point on the contour of the section of the toner particle. A position on the line distant from the contour by 500 nm toward the center of gravity is identified. Then, the operation is performed for one round of the contour of the section of the toner particle to clearly indicate the surface layer region from the contour of the section of the toner particle to the depth of 500 nm. The percentage of an area occupied by the wax domains in the area of the resultant surface layer region is calculated, and is adopted as the Ws.

[Wax Dispersant]

To improve the dispersibility of the wax in the binder resin, a resin having both of a moiety close to the polarity of the wax component and a moiety close to the polarity of the resin may be added as a wax dispersant. Specifically, a styrene-acrylic resin subjected to graft modification with a hydrocarbon compound is preferred. A resin composition obtained by causing a styrene-acrylic resin to react with (grafting the resin to) polyolefin such as polyethylene is more preferred. The content of such wax dispersant (resin composition) is preferably 1.0 part by mass or more and 15.0 parts by mass or less with respect to 100 parts by mass of the binder resin.

[Colorant]

As a colorant, there are given, for example, the following colorants.

As a black colorant, there are given, for example: carbon black; and a colorant toned to a black color with a yellow colorant, a magenta colorant, and a cyan colorant. Although a pigment may be used alone as the colorant, a dye and the pigment are more preferably used in combination to improve the clarity of the colorant in terms of the quality of a full-color image.

As a magenta color pigment, there are given, for example: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, or 282; C.I. Pigment Violet 19; and C.I. Vat Red 1, 2, 10, 13, 15, 23, 29, or 35.

As a magenta color dye, there are given, for example: oil-soluble dyes, such as: C.I. Solvent Red 1, 3, 8, 23, 24, 25, 27, 30, 49, 81, 82, 83, 84, 100, 109, or 121; C.I. Disperse Red 9; C.I. Solvent Violet 8, 13, 14, 21, or 27; and C.I. Disperse Violet 1; and basic dyes, such as: C.I. Basic Red 1, 2, 9, 12, 13, 14, 15, 17, 18, 22, 23, 24, 27, 29, 32, 34, 35, 36, 37, 38, 39, or 40; and C.I. Basic Violet 1, 3, 7, 10, 14, 15, 21, 25, 26, 27, or 28.

As a cyan color pigment, there are given, for example: C.I. Pigment Blue 2, 3, 15:2, 15:3, 15:4, 16, or 17; C.I. Vat Blue 6; C.I. Acid Blue 45; and a copper phthalocyanine pigment in which a phthalocyanine skeleton is substituted with 1 to 5 phthalimidomethyl groups.

For example, C.I. Solvent Blue 70 is given as a cyan color dye.

As a yellow color pigment, there are given, for example: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, or 185; and C.I. Vat Yellow 1, 3, or 20.

For example, C.I. Solvent Yellow 162 is given as a yellow color dye.

The usage amount of the colorant is preferably 0.1 part by mass or more and 30 parts by mass or less with respect to 100 parts by mass of the binder resin.

[Charge Control Agent]

A charge control agent may be incorporated into the toner as required. Although a known charge control agent may be utilized as the charge control agent, a metal compound of an aromatic carboxylic acid is particularly preferred because the compound is colorless, increases the charging speed of the toner, and can stably hold a constant charge quantity.

As a negative charge control agent, there are given, for example: a salicylic acid metal compound; a naphthoic acid metal compound; a dicarboxylic acid metal compound; a polymer-type compound having a sulfonic acid or a carboxylic acid in a side chain thereof; a polymer-type compound having a sulfonate or a sulfonic acid esterified product in a side chain thereof; a polymer-type compound having a carboxylate or a carboxylic acid esterified product in a side chain thereof; a boron compound; a urea compound; a silicon compound; and a calixarene.

As a positive charge control agent, there are given, for example, a quaternary ammonium salt, a polymer-type compound having the quaternary ammonium salt in a side chain thereof, a guanidine compound, and an imidazole compound. The charge control agent may be internally added to the toner particle, or may be externally added thereto.

The addition amount of the charge control agent is preferably 0.2 part by mass or more and 10 parts by mass or less with respect to 100 parts by mass of the binder resin.

[Developer]

The toner, which may be used as a one-component developer, is preferably used as a two-component developer by being mixed with a magnetic carrier for further improving its dot reproducibility. In addition, the use of the toner as the two-component developer is preferred because a stable image can be obtained over a long time period.

The following known magnetic carriers may each be used as the magnetic carrier: surface-oxidized iron powder or unoxidized iron powder; particles of metals, such as iron, lithium, calcium, magnesium, nickel, copper, zinc, cobalt, manganese, chromium, and a rare earth, particles made of alloys thereof, and particles made of oxides thereof; a magnetic material such as ferrite; and a magnetic material-dispersion-type resin carrier (so-called resin carrier) containing a magnetic material and a binder resin holding the magnetic material under a state in which the magnetic material is dispersed therein.

When the toner is mixed with the magnetic carrier to be used as the two-component developer, the mixing ratio of the carrier at the time is set to preferably 2 mass % or more and 15 mass % or less, more preferably 4 mass % or more and 13 mass % or less in terms of the concentration of the toner in the two-component developer because satisfactory results are typically obtained.

[Method of Producing Toner]

Known toner production methods, such as a suspension polymerization method, a kneading pulverization method, an emulsion aggregation method, and a dissolution suspension method, may each be adopted as a method of producing the toner, and the production method is not limited to any one of the methods.

The method of producing the toner in each of the kneading pulverization method and the emulsion aggregation method is specifically described below, but the present invention is not limited thereto.

[Kneading Pulverization Method]

First, in a raw material-mixing step, predetermined amounts of the inorganic fine particles, the binder resin, and the wax, and as required, an additive such as the wax dispersant serving as toner raw materials are weighed, and the materials are blended and mixed.

An apparatus to be used in the mixing is, for example, a Henschel mixer (manufactured by Nippon Coke & Engineering Co., Ltd.), SUPERMIXER (manufactured by Kawata Mfg. Co., Ltd.), RIBOCONE (manufactured by Okawara Mfg. Co., Ltd.), NAUTA MIXER, TURBULIZER, or CYCLOMIX (manufactured by Hosokawa Micron Corporation), SPIRAL PIN MIXER (manufactured by Pacific Machinery & Engineering Co., Ltd.), or LOEDIGE MIXER (manufactured by MATSUBO Corporation).

Next, the resultant mixture is melted and kneaded so that the binder resin may be melted, and the inorganic fine particles, the wax, and the like may be dispersed therein (melt-kneading step).

An apparatus to be used in the melt-kneading is, for example, a TEM-type extruder (manufactured by Toshiba Machine Co., Ltd.), a TEX twin-screw kneader (manufactured by the Japan Steel Works, Ltd.), a PCM kneader (manufactured by Ikegai Ironwork Limited), or KNEADEX (manufactured by Mitsui Mining Co., Ltd.). A continuous kneader, such as a single-screw or twin-screw extruder, is preferred to a batch-type kneader because of such superiority as described below: continuous production can be performed.

Next, the resultant melt-kneaded product is rolled with a twin-roll mill or the like, and is cooled with water or the like.

The resultant cooled product is pulverized to a desired particle diameter. First, the cooled product is coarsely pulverized with a crusher, a hammer mill, a feather mill, or the like, and is further finely pulverized with KRYPTRON SYSTEM (manufactured by Kawasaki Heavy Industries, Ltd.), SUPER ROTOR (manufactured by Nisshin Engineering Inc.), or the like to provide resin particles.

The resultant resin particles may be classified into a desired particle diameter to provide toner particles. An apparatus to be used in the classification is, for example, TURBOPLEX, FACULTY, TSP, or TTSP (manufactured by Hosokawa Micron Corporation), or ELBOW-JET (manufactured by Nittetsu Mining Co., Ltd.).

In addition, the resultant resin particles are preferably thermally treated to provide toner particles. That is, the toner particles are preferably subjected to surface treatment with heat. The performance of the heat treatment alleviates the irregularities of the toner particles to facilitate the achievement of all of the developability, cleaning property, and transferability of the toner.

Further, when coarse particles are present after the performance of the heat treatment, the coarse particles may be removed by classification or sieving as required. Examples of an apparatus to be used in the classification include the above-mentioned apparatus. Meanwhile, an apparatus to be used in the sieving is, for example, ULTRASONIC (manufactured by KOEISANGYO Co., Ltd.), RESONA SIEVE or GYRO-SIFTER (manufactured by Tokuju Corporation), TURBO SCREENER (manufactured by Turbo Kogyo Co., Ltd.), or Hi-BOLTER (manufactured by Toyo Hitec Co., Ltd.).

Meanwhile, the inorganic fine particles and the like may be added to the resultant resin particles as required before the heat treatment step.

A method of thermally treating the resin particles with a heat treatment apparatus illustrated in FIG. 1s specifically described below.

The resin particles supplied in a constant amount by a raw material constant amount supply unit 1 are introduced into an introduction tube 3 arranged on the vertical line of a raw material supply unit by a compressed gas adjusted by a compressed gas flow rate-adjusting unit 2. A mixture that has passed through the introduction tube 3 is uniformly dispersed by a protruding member 4 of a conical shape arranged in the central portion of the raw material supply unit, is introduced into supply tubes 5 radially spreading in 8 directions, and is introduced into a treatment chamber 6 where heat treatment is performed.

At this time, the flow of the resin particles supplied to the treatment chamber 6 is regulated by a regulating unit 9 for regulating the flow of the resin particles, the unit being arranged in the treatment chamber 6. Accordingly, the resin particles supplied to the treatment chamber 6 are heat-treated while swirling in the treatment chamber 6, and are then cooled.

Hot air for heat-treating the supplied resin particles is supplied from a hot air supply unit 7 and distributed by a distribution member 12. The hot air is introduced into the treatment chamber 6 while being caused to swirl spirally by a swirling member 13 for causing the hot air to swirl. With regard to the configuration of such member, the swirling member 13 for causing the hot air to swirl has a plurality of blades, and can control the swirling of the hot air in accordance with the number and angles of the blades.

The temperature of the hot air to be supplied into the treatment chamber 6 in the outlet portion of the hot air supply unit 7 is preferably 100° C. or more and 300° C. or less, more preferably 130° C. or more and 170° C. or less. When the temperature in the outlet portion of the hot air supply unit 7 falls within the ranges, the resin particles can be uniformly treated while the fusion and coalescence of the particles due to excessive heating of the particles are prevented.

The hot air is supplied from the hot air supply unit 7. Further, the heat-treated resin particles that have been heat-treated are cooled by cold air supplied from cold air supply units 8. The temperature of the cold air supplied from the cold air supply units 8 is preferably −20° C. or more and 30° C. or less. When the temperature of the cold air falls within the range, the heat-treated resin particles can be efficiently cooled, and hence the melt adhesion and coalescence of the heat-treated resin particles can be prevented without inhibition of uniform heat treatment of the resin particles. In addition, the absolute moisture content of the cold air is preferably 0.5 $g/m^3$ or more and 15.0 $g/m^3$ or less.

Next, the heat-treated resin particles that have been cooled are recovered by a recovering unit 10 present at the lower end of the treatment chamber 6. The recovering unit 10 has a configuration in which a blower (not shown) is arranged at its tip, and the particles are sucked and conveyed by the blower.

In addition, a powder particle supply port 14 is arranged so that the swirling direction of the supplied resin particles and the swirling direction of the hot air may be the same direction, and the recovering unit 10 is also arranged in a tangential direction in the outer peripheral portion of the treatment chamber 6 so as to maintain the swirling direction of the resin particles that have been caused to swirl. Further, the cold air supplied from the cold air supply units 8 is configured to be supplied from the outer peripheral portion of the apparatus to the inner peripheral surface of the treatment chamber from horizontal and tangential directions.

All of the swirling direction of the resin particles before heat treatment supplied from the powder particle supply port 14, the swirling direction of the cold air supplied from the cold air supply units 8, and the swirling direction of the hot air supplied from the hot air supply unit 7 are the same direction. Accordingly, no turbulent flow occurs in the treatment chamber, and hence a swirling flow in the apparatus is strengthened. Thus, a strong centrifugal force is applied to the resin particles before heat treatment to further improve the dispersibility of the resin particles before heat treatment. Accordingly, resin particles before heat treatment having a small number of coalesced particles and having a uniform shape can be obtained.

The average circularity of the toner is preferably 0.960 or more, more preferably 0.965 or more. When the average circularity of the toner falls within the ranges, the transfer efficiency of the toner is improved.

[Emulsion Aggregation Method]

The emulsion aggregation method is a method including: preparing an aqueous dispersion liquid of fine particles formed of the constituent materials for the toner particles, the fine particles being sufficiently small as compared to a target particle diameter, in advance; aggregating the fine particles in the aqueous medium until the particle diameter of the toner is obtained; and fusing the resins of the aggregated particles through heating to produce the toner.

That is, in the emulsion aggregation method, the toner is produced through: a dispersing step of producing the dispersion liquid of the fine particles formed of the constituent materials for the toner particles; an aggregating step of aggregating the fine particles formed of the constituent materials for the toner particles to control their particle diameters until the particle diameter of the toner is obtained; a fusing step of fusing the resins in the resultant aggregated particles; and a cooling step after the steps.

A shell-forming step of forming a shell containing the wax may be added for unevenly distributing the wax to the vicinities of the surfaces of the toner particles. For example, the following methods are available: a method in which the shell-forming step is added after the aggregating step; and a method in which the shell-forming step is added after the cooling step, and the fusing step and the cooling step are further performed to provide the toner.

[Dispersing Step]

Although the aqueous dispersion liquid of the fine particles of the resins such as the binder resin may be prepared by a known method, a method for the preparation is not limited to such approach. Examples of the known method include: an emulsion polymerization method; a self-emulsification method; a phase-inversion emulsification method including emulsifying a resin by gradually adding an aqueous medium to a solution of the resin dissolved in an organic solvent; and a forced emulsification method including forcibly emulsifying a resin through high-temperature treatment in an aqueous medium without using an organic solvent.

Specifically, the resins such as the binder resin are dissolved in an organic solvent that dissolves the resins, and a surfactant or a basic compound is added to the solution. Subsequently, while stirring is performed with a homogenizer or the like, an aqueous medium is slowly added to precipitate resin fine particles. After that, the solvent is removed through heating or pressure reduction. Thus, an aqueous dispersion liquid of the resin fine particles is produced.

Any organic solvent capable of dissolving the resin may be used as the organic solvent, but an organic solvent that forms a uniform phase with water such as tetrahydrofuran is preferably used from the viewpoint of suppressing the generation of coarse powder.

The surfactant to be used at the time of the emulsification is not particularly limited, but examples thereof include: anionic surfactants, such as sulfate-based, sulfonate-based, carboxylate-based, phosphate-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants. The surfactants may be used alone or in combination thereof.

Examples of the basic compound to be used at the time of the emulsification include: inorganic bases, such as sodium hydroxide and potassium hydroxide; and organic bases, such as ammonia, triethylamine, trimethylamine, dimethylaminoethanol, and diethylaminoethanol. The bases may be used alone or in combination thereof.

The 50% particle diameter (D50) of the resin fine particles on a volume distribution basis is preferably 0.05 μm or more and 1.0 μm or less, more preferably 0.05 μm or more and 0.4 μm or less.

When the 50% particle diameter (D50) on a volume distribution basis is adjusted to fall within the ranges, toner particles having a weight-average particle diameter of 4.0 μm or more and 7.0 μm or less, which is a preferred weight-average particle diameter, can be easily obtained.

A dynamic light scattering-type particle size distribution meter (Nanotrac UPA-EX150: manufactured by Nikkiso Co., Ltd.) is used for the measurement of the 50% particle diameter (D50) on a volume distribution basis.

An aqueous dispersion liquid of inorganic fine particles may be prepared by any one of known methods listed below, but a method for the preparation is not limited to these approaches.

The aqueous dispersion liquid of the inorganic fine particles may be prepared by mixing the inorganic fine particles, an aqueous medium, and a dispersant through use of a known mixing machine, such as a stirrer, an emulsifying machine, or a dispersing machine. Known dispersants, such as a surfactant and a polymer dispersant, may each be used as the dispersant to be used in this case.

Each of the surfactant and the polymer dispersant serving as the dispersant can be removed in the washing step to be described later, but the surfactant is preferred from the viewpoint of washing efficiency. Of the surfactants, an anionic surfactant and a nonionic surfactant are more preferred.

Examples of the surfactant include: anionic surfactants, such as sulfate-based, sulfonate-based, phosphate-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants. Of those, a nonionic surfactant or an anionic surfactant is preferred. In addition, the nonionic surfactant and the anionic surfactant may be used in combination. The surfactants may be used alone or in combination thereof.

In addition, the amount of the dispersant is preferably 1 part by mass or more and 20 parts by mass or less with respect to 100 parts by mass of the inorganic fine particles, and is more preferably 2 parts by mass or more and 10 parts by mass or less from the viewpoint of achieving both of dispersion stability and washing efficiency.

The content of the inorganic fine particles in the aqueous dispersion liquid of the inorganic fine particles is not particularly limited, but is preferably 1 mass % or more and 30 mass % or less with respect to the total mass of the aqueous dispersion liquid of the inorganic fine particles.

In addition, with regard to the dispersed particle diameter of the inorganic fine particles in the aqueous dispersion liquid, a 50% particle diameter (D50) on a volume distribution basis is preferably 3.0 μm or less from the viewpoint of the dispersibility in the toner to be finally obtained. The dispersed particle diameter of the inorganic fine particles dispersed in the aqueous medium is measured with a dynamic light scattering-type particle size distribution meter (NANOTRAC UPA-EX150: manufactured by Nikkiso Co., Ltd.) or a precision particle size distribution-measuring apparatus "Coulter Counter Multisizer 3" (trademark, manufactured by Beckman Coulter, Inc.).

Examples of the known mixing machines, such as the stirrer, the emulsifying machine, and the dispersing machine, to be used in dispersing the inorganic fine particles in the aqueous medium include an ultrasonic homogenizer, a jet mill, a pressure-type homogenizer, a colloid mill, a ball mill, a sand mill, and a paint shaker. Those mixing machines may be used alone or in combination thereof.

An aqueous dispersion liquid of release agent fine particles may be prepared by any one of known methods listed below, but a method for the preparation is not limited to these approaches.

The aqueous dispersion liquid of the release agent fine particles may be produced by adding a release agent to an aqueous medium containing a surfactant, heating the mixture to a temperature equal to or higher than the melting point of the release agent, and dispersing the mixture into particles with a homogenizer having a strong shear application capability (e.g., "Clearmix W-Motion" manufactured by M Technique Co., Ltd.) or a pressure discharge-type dispersing machine (e.g., "Gaulin Homogenizer" manufactured by Gaulin), followed by cooling to a temperature equal to or lower than the melting point.

With regard to the dispersed particle diameter of the release agent fine particles in the aqueous dispersion liquid, a 50% particle diameter (D50) on a volume distribution basis is preferably 0.03 μm or more and 1.0 μm or less, more preferably 0.1 μm or more and 0.5 μm or less. In addition, it is preferred that coarse particles of 1 μm or more be absent.

When the dispersed particle diameter of the release agent fine particles falls within the ranges, the elution of the release agent at the time of the fixation of the toner becomes satisfactory, and hence the hot offset temperature thereof can be increased. In addition, the occurrence of the filming thereof to a photosensitive member can be suppressed.

The dispersed particle diameter of the release agent fine particles dispersed in the aqueous medium is measured with a dynamic light scattering-type particle size distribution meter (Nanotrac UPA-EX150: manufactured by Nikkiso Co., Ltd.).

An aqueous dispersion liquid of colorant fine particles to be used as required may be prepared by any one of known methods listed below, but a method for the preparation is not limited to these approaches.

The aqueous dispersion liquid of the colorant fine particles may be prepared by mixing a colorant, an aqueous medium, and a dispersant through use of a known mixing machine, such as a stirrer, an emulsifying machine, or a dispersing machine. Known dispersants, such as a surfactant and a polymer dispersant, may each be used as the dispersant to be used in this case.

Each of the surfactant and the polymer dispersant serving as the dispersant can be removed in the washing step to be described later, but the surfactant is preferred from the viewpoint of washing efficiency. Of the surfactants, an anionic surfactant and a nonionic surfactant are more preferred.

Examples of the surfactant include: anionic surfactants, such as sulfate-based, sulfonate-based, phosphate-based, and soap-based surfactants; cationic surfactants, such as amine salt-type and quaternary ammonium salt-type surfactants; and nonionic surfactants, such as polyethylene glycol-based, alkylphenol ethylene oxide adduct-based, and polyhydric alcohol-based surfactants. Of those, a nonionic surfactant or an anionic surfactant is preferred. In addition, the nonionic surfactant and the anionic surfactant may be used in combination. The surfactants may be used alone or in combination thereof.

In addition, the amount of the dispersant is preferably 1 part by mass or more and 20 parts by mass or less with respect to 100 parts by mass of the colorant, and is more preferably 2 parts by mass or more and 10 parts by mass or less from the viewpoint of achieving both of dispersion stability and washing efficiency.

The content of the colorant in the aqueous dispersion liquid of the colorant fine particles is not particularly limited, but is preferably from 1 mass % to 30 mass % with respect to the total mass of the aqueous dispersion liquid of the colorant fine particles.

In addition, with regard to the dispersed particle diameter of the colorant fine particles in the aqueous dispersion liquid, a 50% particle diameter (D50) on a volume distribution basis is preferably 0.5 μm or less from the viewpoint of the dispersibility of the colorant in the toner to be finally obtained. In addition, for the same reason, a 90% particle diameter (D90) on a volume distribution basis is preferably 2 μm or less. The dispersed particle diameter of the colorant fine particles dispersed in the aqueous medium is measured with a dynamic light scattering-type particle size distribution meter (Nanotrac UPA-EX150: manufactured by Nikkiso Co., Ltd.).

Examples of the known mixing machines, such as the stirrer, the emulsifying machine, and the dispersing machine, to be used in dispersing the colorant in the aqueous medium include an ultrasonic homogenizer, a jet mill, a pressure-type homogenizer, a colloid mill, a ball mill, a sand mill, and a paint shaker. Those mixing machines may be used alone or in combination thereof

[Aggregating Step]

In the aggregating step, the aqueous dispersion liquid of the binder resin fine particles, the aqueous dispersion liquid of the inorganic fine particles, and the aqueous dispersion liquid of the release agent fine particles, and as required, the aqueous dispersion liquid of the colorant fine particles are mixed to prepare a mixed liquid. Next, the fine particles in the prepared mixed liquid are aggregated to form an aggregate having a target particle diameter. At this time, aggregated particles in which the resin fine particles, the colorant fine particles, and the release agent fine particles are aggregated are preferably formed by adding and mixing an aggregating agent, and appropriately applying heat and/or mechanical power as required.

An aggregating agent containing a metal ion that is divalent or more is preferably used as the aggregating agent.

The aggregating agent containing a metal ion that is divalent or more has a high aggregating force, and hence the addition of a small amount thereof can ionically neutralize the acidic polar groups of the resin fine particles, and the ionic surfactant in each of the aqueous dispersion liquid of the resin fine particles, the aqueous dispersion liquid of the inorganic fine particles, the aqueous dispersion liquid of the release agent fine particles, and the aqueous dispersion liquid of the colorant fine particles. As a result, the resin fine particles, the inorganic fine particles, the release agent fine particles, and the colorant fine particles are aggregated by the effects of salting-out and ionic crosslinking.

The aggregating agent containing a metal ion that is divalent or more is, for example, a metal salt that is divalent or more, or a polymer of the metal salt. Specific examples thereof include, but not limited to, divalent inorganic metal salts, such as calcium chloride, calcium nitrate, magnesium chloride, magnesium sulfate, and zinc chloride, trivalent metal salts, such as iron(III) chloride, iron(III) sulfate, aluminum sulfate, and aluminum chloride, and inorganic metal salt polymers, such as polyaluminum chloride, polyaluminum hydroxide, and calcium polysulfide. Those aggregating agents may be used alone or in combination thereof.

Although the aggregating agent may be added in the form of any one of dry powder or an aqueous solution obtained by dissolving the agent in an aqueous medium, the agent is preferably added in the form of an aqueous solution for causing uniform aggregation.

In addition, the addition and mixing of the aggregating agent are preferably performed at a temperature equal to or lower than the glass transition temperature of the resin in the mixed liquid. When the mixing is performed under the temperature condition, the aggregation uniformly advances. The mixing of the aggregating agent into the mixed liquid may be performed with any one of known mixing apparatus, such as a homogenizer and a mixer.

Although the average particle diameter of the aggregated particles to be formed in the aggregating step is not particular limited, it is typically preferred that the average particle diameter be controlled so as to be comparable to the average particle diameter of the toner to be finally obtained. The particle diameters of the aggregated particles can be easily controlled by appropriately adjusting the temperature, the solid content concentration of the mixed liquid, the concentration of the aggregating agent, and stirring conditions.

[Fusing Step]

In the fusing step, first, an aggregation inhibitor is added to the dispersion liquid containing the aggregated particles obtained in the aggregating step under the same stirring as that in the aggregating step. Examples of the aggregation inhibitor include: a basic compound, which displaces the equilibrium of the acidic polar groups of the resin fine particles to a dissociation side to stabilize the aggregated particles; and a chelating agent, which partially dissociates ionic crosslinking between the acidic polar groups of the resin fine particles and the metal ion serving as the aggregating agent to form a coordination bond with the metal ion, to thereby stabilize the aggregated particles. Of those, a chelating agent is preferred because the agent has a larger aggregation-inhibiting effect.

After the dispersion state of the aggregated particles in the dispersion liquid has become stable through the action of the aggregation inhibitor, the aggregated particles are fused by heating to a temperature equal to or higher than the glass transition temperature of the binder resin.

Any known water-soluble chelating agent may be used as the chelating agent without particular limitation. Specific examples thereof include: oxycarboxylic acids, such as tartaric acid, citric acid, and gluconic acid, and sodium salts thereof and iminodiacetic acid (IDA), nitrilotriacetic acid (NTA), and ethylenediaminetetraacetic acid (EDTA), and sodium salts thereof.

The chelating agent can coordinate with the metal ion of the aggregating agent present in the dispersion liquid of the aggregated particles to change an environment in the dispersion liquid from a state that is electrostatically instable, and is hence liable to cause aggregation to a state that is electrostatically stable, and hence hardly causes further aggregation. Thus, further aggregation of the aggregated particles in the dispersion liquid is suppressed, and hence the aggregated particles can be stabilized.

The chelating agent is preferably an organic metal salt having a carboxylic acid that is trivalent or more because the salt exhibits an effect even when added in a small amount, and provides toner particles having a sharp particle size distribution.

In addition, the addition amount of the chelating agent is preferably 1 part by mass or more and 30 parts by mass or less, more preferably 2.5 parts by mass or more and 15 parts by mass or less with respect to 100 parts by mass of the resin particles from the viewpoint of achieving both of stabilization from an aggregated state and washing efficiency.

When the aggregated particles are cooled to a temperature equal to or lower than the glass transition temperature of the binder resin at the time point when a desired circularity is obtained by the fusing step, irregularly shaped particles that are not spherical may be obtained.

[Shell-Forming Step]

The shell-forming step is a step of causing desired resin fine particles, or desired resin fine particles and release agent fine particles to adhere to the particles after the aggregating step or the particles after the fusing step, the particles serving as core particles, to coat the core particles with the fine particles. Herein, the binder resin and the release agent are mixed, and are then used as a shell. However, the binder resin may be further formed into a shell after the release agent has been formed into a shell.

[When Shell-Forming Step is Added after Aggregating Step]

An aqueous dispersion liquid obtained by mixing the aqueous dispersion liquids of the binder resin and the release agent is added to the aggregated particles formed in the aggregating step. A method for the addition is not particularly limited, and the dispersion liquid may be added in one stroke, or may be added while being divided into portions. In addition, when the amount of the aggregating agent is insufficient, the aggregating agent may be additionally added, and the addition may be performed at any one of the following timings: before the addition of the aqueous dispersion liquid of the binder resin and the release agent; during the addition; and after the addition. The agent may be added a plurality of times.

After the shell formation, the fusing step is performed to provide core-shell particles.

[When Shell-Forming Step is Added after Fusing Step]

The aqueous dispersion liquid of the binder resin and the release agent is added to the particles obtained in the fusing step. The addition may be performed after the cooling of the particles. A method for the addition is not particularly limited, and the dispersion liquid may be added in one stroke, or may be added while being divided into portions.

After that, the aggregating agent is added as required to be caused to adhere to the particles to which the binder resin and the release agent have been fused. The fusing step is further performed to provide core-shell particles.

Next, the particles subjected to the fusion treatment are subjected to washing, filtration, drying, and the like. Thus, the toner particles can be obtained.

The resultant toner particles may be used as they are as the toner. Inorganic fine particles made of, for example, silica, alumina, titania, and calcium carbonate, or resin fine particles made of, for example, a vinyl-based resin, a polyester resin, and a silicone resin may be added to the toner particles as required by applying a shear force under a dry state. Those inorganic fine particles or resin fine particles function as an external additive, such as a fluidity aid or a cleaning aid.

Methods of measuring the various physical properties of the toner and its raw materials are described below.

[Method of Measuring Outflow Start Temperature T1]

Measurement is performed with a capillary rheometer of a constant-pressure extrusion system using weights "flow characteristic-evaluating apparatus Flow Tester CFT-500D" (manufactured by Shimadzu Corporation) in accordance with a manual included with the apparatus. In this apparatus, a measurement sample filled in a cylinder is increased in temperature to be melted while a predetermined load is applied to the measurement sample with a piston from above, and the melted measurement sample is extruded from a die in a bottom part of the cylinder. At this time, a flow curve representing a relationship between a piston descent amount and the temperature can be obtained. The outflow start temperature T1 is identified from the resultant flow curve.

In addition, in Examples to be described later, the softening points of the resin and the toner are described, and the softening points each refer to a "melting temperature in a ½ method" described in the manual included with the "flow characteristic-evaluating apparatus Flow Tester CFT-500D."

The measurement sample to be used is obtained by subjecting about 1.0 g of the toner to compression molding for about 60 seconds under about 10 MPa through use of a tablet compressing machine (e.g., NT-100H, manufactured by NPa SYSTEM Co., Ltd.) under an environment at 25° C. to form the toner into a cylindrical shape having a diameter of about 8 mm.

Conditions for the measurement with the CFT-500D are as described below.

Test mode: heating method
Starting temperature: 40° C.
Reached temperature: 200° C.
Measurement interval: 1.0° C.
Rate of temperature increase: 4.0° C./min
Piston sectional area: 1.000 $cm^2$
Test load (piston load): 10.0 kgf (0.9807 MPa)
Preheating time: 300 seconds
Diameter of hole of die: 1.0 mm
Length of die: 1.0 mm

[Method of Measuring Thermal Expansion Coefficient (Linear Expansion Coefficient) of Inorganic Fine Particles]

The thermal expansion coefficient of the inorganic fine particles is calculated as described below.

The lattice constants of the inorganic fine particles are measured with the following apparatus under the following conditions.

Measuring apparatus: MiniFlex 600 (product name, manufactured by Rigaku Corporation)
Sample medium temperature attachment hot plate
X-ray source: Cu-Kα ray
Slit system: DS=SS=1.25°, RS=0.3 mm
Detector: Scintillation counter
Scan system: 2θ-θ continuous scan
Measurement range (2θ): From 5° to 60°
Step width (2θ): 0.02°
Scan rate: 1°/min
Measurement temperature: 30° C./50° C./70° C./100° C.
Measurement is performed 10 minutes after a target temperature has been achieved.

The lattice constants in the a-axis, b-axis, and c-axis of the sample at the respective temperatures are determined based on the resultant graph and an inorganic material database, and the volume expansion change thereof is converted into linear expansion, followed by the determination of the thermal expansion coefficient.

[Method of Measuring Number-Average Particle Diameter of Inorganic Fine Particles]

The number-average particle diameter of the inorganic fine particles is calculated from an image of the inorganic fine particles (when the toner includes a pigment, a mixture with the pigment) separated from the toner, which has been taken with a scanning electron microscope S-4800 (Hitachi High-Technologies Corporation). The separation of the inorganic fine particles may be performed by the above-mentioned method. Conditions under which the image is taken with the S-4800 are as described below.

(1) Sample Production

A conductive paste is thinly applied to a sample stage (aluminum sample stage measuring 15 mm by 6 mm), and the inorganic fine particles separated from the toner are sprayed thereonto. Further, air is blown to remove extra inorganic fine particles from the sample stage, and the remainder is sufficiently dried. The sample stage is set in a sample holder, and the height of the sample stage is regulated to 36 mm with a sample height gauge.

(2) Setting of Conditions for Observation with S-4800

The number-average particle diameter is calculated with an image obtained through the observation of a backscattered electron image with the S-4800. Liquid nitrogen is injected into an anticontamination trap mounted on the casing of the S-4800 until the liquid nitrogen flows out, followed by standing for 30 minutes. The "PC-SEM" of the S-4800 is activated to perform flushing (the cleaning of a FE chip that is an electron source). The acceleration voltage-displaying portion of a control panel on the screen of the S-4800 is clicked, and the [Flushing] button thereof is pressed to open a flushing performance dialog. The fact that a flushing intensity is 2 is recognized, and the flushing is performed. The fact that an emission current caused by the flushing is from 20 μA to 40 μA is recognized. The sample holder is inserted into the sample chamber of the casing of the S-4800. An [Origin] button on the control panel is pressed to move the sample holder to an observation position.

The acceleration voltage-displaying portion is clicked to open a HV setting dialog, and an acceleration voltage and the emission current are set to [1.1 kV] and [20 μA], respectively. In the [Basics] tab of the operation panel of the S-4800, a signal selection mode is set to [SE], and a SE detector is brought into a mode for observing the sample in a backscattered electron image by selecting [Up (U)] and [+BSE], and selecting [L.A.100] in a selection box on the right side of the [+BSE]. Similarly in the [Basics] tab of the operation panel, the probe current of an electron optical system condition block is set to [Normal], the focus mode thereof is set to [UHR], and the WD thereof is set to [4.5 mm]. The [ON] button of the acceleration voltage-displaying portion of the control panel is pressed to apply the acceleration voltage to the sample.

(3) Focus Adjustment

The focus knob [COARSE] of the operation panel is rotated, and when the sample is in focus to some extent, aperture alignment is adjusted. The [Align] of the control panel is clicked to display an alignment dialog, and [Beam] is selected. The STIGMA/ALIGNMENT knob (X, Y) of the operation panel is rotated to move a beam to be displayed to the center of a concentric circle. Next, [Aperture] is selected, and the STIGMA/ALIGNMENT knob (X, Y) is rotated one by one to stop the movement of the image of the sample or to align the beam with the center so that the movement may be minimum. The aperture dialog is closed, and the sample is brought into focus by autofocusing. After that, the magnification of the S-4800 is set to 80,000 (80 k), and focus adjustment is performed with the focus knob and the STIGMA/ALIGNMENT knob in the same manner as that described above, followed by bringing the sample into focus by autofocusing again. The operation is repeated again to bring the sample into focus. In this case, when the inclination angle of an observation surface is large, the accuracy with which the number-average particle diameter is measured is liable to be low. Accordingly, a surface whose inclination is suppressed to the extent possible is selected and analyzed by selecting an observation surface whose entirety is simultaneously brought into focus at the time of the focus adjustment.

(4) Image Storage

Brightness adjustment is performed by an ABC mode, and an image of the sample is taken at a size of 640×480 pixels and stored. The following analysis is performed with the image file. The particle diameters of at least 500 inorganic fine particles are measured, and an image is obtained by performing photographing at a plurality of sites while avoiding taking an image of the same inorganic fine particle so that a number required for the calculation of the number-average particle diameter may be obtained.

(5) Image Analysis

The particle diameters of at least 500 inorganic fine particles are measured, and the number-average particle diameter is determined by using the obtained results. In the present invention, the number-average particle diameter is calculated by subjecting the image obtained by the above-mentioned approach to binarization processing with image analysis software Image-Pro Plus ver. 5.0.

When a pigment or the like is included in the inorganic fine particles separated from the toner, the measurement is performed after particles except the inorganic fine particles that are to be subjected to the measurement have been removed by performing elemental analysis with an energy dispersive X-ray analyzer (EDS), or judgment based on a particle diameter and a shape in advance.

[Method of Measuring Number-Average Particle Diameter (D1) and Weight-Average Particle Diameter (D4) of Toner Particles]

The number-average particle diameter (D1) and weight-average particle diameter (D4) of the toner particles are measured with the number of effective measurement channels of 25,000 by using a precision particle size distribution-measuring apparatus based on a pore electrical resistance method provided with a 100 μm aperture tube "Coulter Counter Multisizer 3" (trademark, manufactured by Beckman Coulter, Inc.) and dedicated software included therewith "Beckman Coulter Multisizer 3 Version 3.51" (manufactured by Beckman Coulter, Inc.) for setting measurement conditions and analyzing measurement data. Then, the measurement data is analyzed to calculate the diameters.

An electrolyte aqueous solution prepared by dissolving guaranteed sodium chloride in ion-exchanged water so as to have a concentration of about 1 mass %, such as "ISOTON II" (manufactured by Beckman Coulter, Inc.), may be used in the measurement.

The dedicated software is set as described below prior to the measurement and the analysis.

In the "change standard measurement method (SOM)" screen of the dedicated software, the total count number of a control mode is set to 50,000 particles, the number of times of measurement is set to 1, and a value obtained by using "standard particles each having a particle diameter of 10.0 μm" (manufactured by Beckman Coulter, Inc.) is set as a Kd value. A threshold and a noise level are automatically set by pressing a threshold/noise level measurement button. In addition, a current is set to 1,600 μA, a gain is set to 2, and an electrolyte solution is set to ISOTON II, and a check mark is placed in a check box as to whether the aperture tube is flushed after the measurement.

In the "setting for conversion from pulse to particle diameter" screen of the dedicated software, a bin interval is set to a logarithmic particle diameter, the number of particle diameter bins is set to 256, and a particle diameter range is set to the range of 2 μm or more and 60 μm or less.

A specific measurement method is as described below.

(1) About 200 mL of the electrolyte aqueous solution is loaded into a 250 mL round-bottom beaker made of glass dedicated for the Multisizer 3. The beaker is set in a sample stand, and the electrolyte aqueous solution in the beaker is stirred with a stirrer rod at 24 rotations/sec in a counter-clockwise direction. Then, dirt and bubbles in the aperture tube are removed by the "aperture tube flush" function of the dedicated software.

(2) About 30 mL of the electrolyte aqueous solution is loaded into a 100 mL flat-bottom beaker made of glass, and about 0.3 mL of the following diluted solution is added as a dispersant thereto.

Diluted solution: Diluted solution prepared by diluting "Contaminon N" (a 10 mass % aqueous solution of a neutral detergent for washing a precision measuring device formed of a nonionic surfactant, an anionic surfactant, and an organic builder and having a pH of 7, manufactured by Wako Pure Chemical Industries, Ltd.) with ion-exchanged water by three mass fold (3) A predetermined amount of ion-exchanged water is loaded into the water tank of the following ultrasonic dispersing unit having an electrical output of 120 W in which two oscillators each having an oscillatory frequency of 50 kHz are built under the state of being out of phase by 180°. About 2 mL of the Contaminon N is added to the water tank.

Ultrasonic dispersing unit: "Ultrasonic Dispersion System Tetora 150" (manufactured by Nikkaki Bios Co., Ltd.)

(4) The beaker in the section (2) is set in the beaker fixing hole of the ultrasonic dispersing unit, and the ultrasonic dispersing unit is operated. Then, the height position of the beaker is adjusted in order that the liquid level of the electrolyte aqueous solution in the beaker may resonate with an ultrasonic wave from the ultrasonic dispersing unit to the fullest extent possible.

(5) About 10 mg of the toner is gradually added to and dispersed in the electrolyte aqueous solution in the beaker in the section (4) under a state in which the electrolyte aqueous solution is irradiated with ultrasonic wave. Then, the ultrasonic dispersion treatment is continued for an additional 60 seconds. The temperature of water in the water tank is appropriately adjusted to 15° C. or more and 40° C. or less in the ultrasonic dispersion.

(6) The electrolyte aqueous solution in the section (5) in which the toner has been dispersed is added dropwise with a pipette to the round-bottom beaker in the section (1) placed in the sample stand, and the concentration of the toner to be measured is adjusted to about 5%. Then, measurement is performed until the particle diameters of 50,000 particles are measured.

(7) The measurement data is analyzed with the dedicated software included with the apparatus, and the number-average particle diameter (D1) and the weight-average particle diameter (D4) are calculated. When the dedicated software is set to show a graph in a vol % unit, an "average diameter" on the "analysis/number statistics (arithmetic average)" screen of the software is the number-average particle diameter (D1), and an "average diameter" on the "analysis/volume statistics (arithmetic average)" screen thereof is the weight-average particle diameter (D4).

[Method of Measuring Average Circularity]

The average circularity of the toner particles is measured with a flow-type particle image analyzer "FPIA-3000" (manufactured by Sysmex Corporation) under measurement and analysis conditions at the time of a calibration operation.

A specific measurement method is as described below. First, about 20 mL of ion-exchanged water from which an impure solid and the like have been removed in advance is loaded into a glass-made container. About 0.2 mL of a diluted solution obtained by diluting "Contaminon N" (a 10 mass % aqueous solution of a neutral detergent for washing a precision measuring unit formed of a nonionic surfactant, an anionic surfactant, and an organic builder, and having a pH of 7, manufactured by Wako Pure Chemical Industries, Ltd.) with ion-exchanged water by about three mass fold is added as a dispersant to the container. Further, about 0.02 g of a measurement sample is added to the container, and the mixture is subjected to dispersion treatment with an ultrasonic dispersing unit for 2 minutes to provide a dispersion liquid for measurement. At that time, the dispersion liquid is appropriately cooled so as to have a temperature of 10° C. or more and 40° C. or less. A desktop ultrasonic cleaning and dispersing unit having an oscillatory frequency of 50 kHz and an electrical output of 150 W ("VS-150" (manufactured by VELVO-CLEAR)) is used as the ultrasonic dispersing unit. A predetermined amount of ion-exchanged water is loaded into the water tank of the unit, and about 2 mL of the Contaminon N is added to the water tank.

The flow-type particle image analyzer mounted with a standard objective lens (magnification: 10) was used in the measurement, and a particle sheath "PSE-900A" (manufactured by Sysmex Corporation) was used as a sheath liquid. The dispersion liquid prepared in accordance with the foregoing procedure is introduced into the flow-type particle image analyzer, and the particle diameters of 3,000 toner particles are measured according to the total count mode of a HPF measurement mode. Then, the average circularity of the toner particles is determined by: setting a binarization threshold at the time of particle analysis to 85%; and limiting particle diameters to be analyzed to circle-equivalent diameters of 1.985 μm or more and less than 39.69 μm.

At the time of the measurement, automatic focusing is performed with standard latex particles (obtained by diluting "RESEARCH AND TEST PARTICLES Latex Microsphere Suspensions 5200A" manufactured by Duke Scientific Corporation with ion-exchanged water) before the start of the measurement. After that, focusing is preferably performed every 2 hours from the start of the measurement.

In Examples of the present application, a flow-type particle image analyzer that had been subjected to a calibration operation by Sysmex Corporation and had received a calibration certificate issued by Sysmex Corporation was used. The measurement was performed under the same measurement and analysis conditions as those at the time of the reception of the calibration certificate except that the particle diameters to be analyzed were limited to circle-equivalent diameters of 1.985 μm or more and less than 39.69 μm.

[Method of Measuring Softening Point of Resin]

The softening point of the resin is measured with a capillary rheometer of a constant-pressure extrusion system using weights "flow characteristic-evaluating apparatus Flow Tester CFT-500D" (manufactured by Shimadzu Corporation) in accordance with a manual included with the apparatus. In this apparatus, a measurement sample filled in a cylinder is increased in temperature to be melted while a predetermined load is applied to the measurement sample with a piston from above, and the melted measurement sample is extruded from a die in a bottom part of the cylinder. At this time, a flow curve representing a relationship between a piston descent amount and the temperature can be obtained.

In the present invention, a "melting temperature in a ½ method" described in the manual included with the "flow characteristic-evaluating apparatus Flow Tester CFT-500D" is adopted as a softening point. The melting temperature in the ½ method is calculated as described below. First, ½ of a difference between a descent amount Smax of the piston at a time when the outflow is finished and a descent amount Smin of the piston at a time when the outflow is started is determined (The ½ of the difference is represented by X. X=(Smax−Smin)/2). Then, the temperature when the descent amount of the piston reaches the sum of X and Smin in the flow curve is the melting temperature in the ½ method.

The measurement sample to be used is obtained by subjecting about 1.0 g of the resin to compression molding for about 60 seconds under about 10 MPa through use of a tablet compressing machine (e.g., NT-100H, manufactured by NPa SYSTEM Co., Ltd.) under an environment at 25° C. to form the resin into a cylindrical shape having a diameter of about 8 mm.

Conditions for the measurement with the CFT-500D are as described below.

Test mode: heating method

Starting temperature: 40° C.

Reached temperature: 200° C.

Measurement interval: 1.0° C.

Rate of temperature increase: 4.0° C./min

Piston sectional area: 1.000 $cm^2$

Test load (piston load): 10.0 kgf (0.9807 MPa)

Preheating time: 300 seconds

Diameter of hole of die: 1.0 mm

Length of die: 1.0 mm

[Measurement of Peak Temperature and Calorific Value of Wax]

The peak temperature and calorific value of the wax are measured with a differential scanning calorimeter "Q1000" (manufactured by TA Instruments) in conformity with ASTM D3418-82. The melting points of indium and zinc are used for the temperature correction of the detecting portion of the apparatus, and the heat of fusion of indium is used for the correction of a heat quantity.

Specifically, about 5 mg of the sample (toner) is precisely weighed, and is loaded into an aluminum-made pan, and the measurement is performed by the following procedure through use of an empty aluminum-made pan as a reference.

A step of heating the sample from 20° C. to 180° C. at a rate of temperature increase of 10° C./min (step I) is performed, and then a step of cooling the sample to 20° C. at a rate of temperature decrease of 10° C./min (step II) is performed, followed by the performance of a step of heating the sample from 20° C. to 180° C. again at a rate of temperature increase of 10° C./min (step III).

The peak temperature (° C.) of a peak derived from the wax observed in the step II is represented by T2w, and the calorific value (J/g) of the wax is represented by H2w. The peak temperature (° C.) of a peak derived from crystalline polyester observed in the step II is represented by T2c, and the calorific value (J/g) of the polyester is represented by H2c. In addition, the temperature at which the maximum endothermic peak of a DSC curve observed in the step III appears is adopted as the peak temperature of the maximum endothermic peak of the wax.

[Method of Calculating Content (Vol %) of Inorganic Fine Particles]

The content of the inorganic fine particles is calculated by using the number-average particle diameter of the inorganic fine particles and the number-average particle diameter of the toner obtained by the above-mentioned measurement methods. Specifically, the content is a value obtained by dividing the "cube of the number-average particle diameter of the inorganic fine particles" by the "cube of the number-average particle diameter of the toner," and multiplying the resultant value by 100.

EXAMPLES

The present invention is described below by way of Production Examples and Examples. The present invention is not limited thereto. The number of parts in the following formulation is represented in the unit of part(s) by mass unless otherwise stated.

(Production Example of Inorganic Fine Particles A)

| | |
|---|---|
| Oxalic acid dihydrate | 3.1 parts |
| Zirconium oxychloride octahydrate | 15.3 parts |
| Pure water | 73.2 parts |

The contents of a beaker containing the above-mentioned pure water were stirred with a three-one motor, and the above-mentioned other materials were weighed and added thereto to produce a dissolved liquid. Next, 8.4 parts of an 85 mass % aqueous solution of phosphoric acid was added to the dissolved liquid while the liquid was stirred. Next, the pH of the mixture was adjusted to 2.2 with an aqueous solution of sodium hydroxide adjusted to 20 mass %, and then the mixture was stirred at 98° C. for 10 hours. After that, the resultant precipitate was filtered and washed, and was dried with a dryer at 120° C. for 24 hours to provide zirconium phosphate ($Zr_2(PO_4)_3$). The resultant zirconium phosphate was shredded with a coffee mill, and the number-average particle diameter of the resultant particles was measured to be 4.0 μm. Next, the particles were classified with ELBOW-JET (manufactured by Nittetsu Mining Co., Ltd.) of an inertial classification system so that a desired particle diameter was obtained. The physical properties of the resultant inorganic fine particles A are shown in Table 1.

(Production Example of Inorganic Fine Particles B)

| | |
|---|---|
| Tungsten trioxide (number-average particle diameter: 1.0 μm) | 15.0 parts |
| 40 mass % polycarboxylic acid ammonium salt | 2.5 parts |
| Pure water | 82.5 parts |

The above-mentioned materials were weighed into a beaker. Next, the mixture was stirred with a three-one motor at 27° C. for 1 hour to provide a slurry. Next, 20.6 parts of zirconium hydroxide and 15.0 parts of an 85 mass % aqueous solution of phosphoric acid were added to the slurry, and the mixture was further stirred for 4 hours to be subjected to a reaction.

After the reaction, the resultant was dried with a dryer at 200° C. for 24 hours or more, and was then calcined with a calcining furnace at 950° C. for 2 hours to provide zirconium phosphate tungstate ($Zr_2(WO_4)(PO_4)_2$). The resultant zirconium phosphate tungstate was shredded with a coffee mill. The physical properties of the resultant inorganic fine particles B are shown in Table 1.

(Production Examples of Inorganic Fine Particles C to G)

Inorganic fine particles C to G were obtained in the same manner as in the inorganic fine particles A except that after zirconium phosphate particles having a number-average particle diameter of 4.0 μm had been obtained in the same manner as in the inorganic fine particles A, the edge of the ELBOW-JET classifier was adjusted. The physical properties of the resultant inorganic fine particles C to G are shown in Table 1.

(Production Example of Inorganic Fine Particles H)

NEOCERAM N-0 manufactured by Nippon Electric Glass Co., Ltd. was pulverized with a hammer to a diameter of about 100 mm or less, and was then coarsely pulverized with a hammer mill to a diameter of 1 mm or less to provide a coarsely pulverized product. The resultant coarsely pulverized product was finely pulverized with a mechanical pulverizer (T-250, manufactured by Freund-Turbo Corporation). Further, the finely pulverized product was classified with a rotary classifier (200TSP, manufactured by Hosokawa Micron Corporation) to provide inorganic fine particles H having a number-average particle diameter of 1.5 The physical properties of the resultant inorganic fine particles H are shown in Table 1.

(Production Example of Inorganic Fine Particles I)

The inorganic fine particles H were melted at 1,600° C., and were then cooled under a plate state to provide a glass plate. Next, the plate was heated from 600° C. to 930° C. at 1° C./min, and was maintained at the temperature for 30 minutes. After that, the plate was slowly cooled to 600° C. at 1° C./min, and was rapidly cooled to normal temperature to provide crystallized glass. After that, the glass was pulverized in the same manner as in the inorganic fine particles H to provide inorganic fine particles I having a number-average particle diameter of 1.5 The physical properties of the resultant inorganic fine particles I are shown in Table 1.

TABLE 1

| | Kind | Number-average particle diameter [μm] | Specific gravity [g/cm$^3$] | Linear thermal expansion coefficient [$10^{-6}$/K] |
|---|---|---|---|---|
| Inorganic fine particles A | Zirconium phosphate | 1.5 | 3.2 | −2.0 |
| Inorganic fine particles B | Zirconium phosphate tungstate | 1.3 | 3.9 | −3.0 |
| Inorganic fine particles C | Zirconium phosphate | 0.5 | 3.2 | −2.0 |
| Inorganic fine particles D | Zirconium phosphate | 2.0 | 3.2 | −2.0 |
| Inorganic fine particles E | Zirconium phosphate | 0.1 | 3.2 | −2.0 |
| Inorganic fine particles F | Zirconium phosphate | 3.0 | 3.2 | −2.0 |
| Inorganic fine particles G | Zirconium phosphate | 3.2 | 3.2 | −2.0 |
| Inorganic fine particles H | Crystallized glass | 1.5 | 2.5 | −0.2 |
| Inorganic fine particles I | Crystallized glass | 1.5 | 2.5 | 0.0 |

A T1 at the time of the determination of the thermal expansion coefficients in Table 1 is 85° C., which is an outflow start temperature measured with toners in Examples to be described later. In addition, the thermal expansion coefficients in Table 1 for the inorganic fine particles A to G are maximum values in the range of from 30° C. to 85° C., and those for the inorganic fine particles H and I are minimum values in the range of from 30° C. to 85° C.

(Production Example of Amorphous Polyester Resin A)

Polyoxypropylene(2.2)-2,2-bis(4-hydroxyphenyl)propane: 73.3 parts (100.0 mol % with respect to the total number of moles of the polyhydric alcohol)

Terephthalic acid: 22.4 parts (82.0 mol % with respect to the total number of moles of the polyvalent carboxylic acids)

Adipic acid: 4.3 parts (18.0 mol % with respect to the total number of moles of the polyvalent carboxylic acids)

Titanium tetrabutoxide (esterification catalyst): 0.5 part

The above-mentioned materials were weighed into a reaction vessel with a condenser, a stirrer, a nitrogen-introducing tube, and a thermocouple. Next, the inside of the flask was purged with a nitrogen gas, and then the temperature of the mixture was gradually increased while the mixture was stirred. The mixture was subjected to a reaction for 4 hours while being stirred at a temperature of 200° C.

Thus, an amorphous polyester resin A was obtained. The resultant amorphous polyester resin A had an outflow start temperature of 80° C. and a softening point of 95° C.

(Production Example of Amorphous Polyester Resin B)

Polyoxypropylene(2.2)-2,2-bis(4-hydroxyphenyl)propane: 72.4 parts (100.0 mol % with respect to the total number of moles of the polyhydric alcohol)

Terephthalic acid: 22.4 parts (80.0 mol % with respect to the total number of moles of the polyvalent carboxylic acids)

Adipic acid: 3.4 parts (14.0 mol % with respect to the total number of moles of the polyvalent carboxylic acids)

Titanium tetrabutoxide (esterification catalyst): 0.5 part

The above-mentioned materials were weighed into a reaction vessel with a condenser, a stirrer, a nitrogen-introducing tube, and a thermocouple. Next, the inside of the flask was purged with a nitrogen gas, and then the temperature of the mixture was gradually increased while the mixture was stirred. The mixture was subjected to a reaction for 2 hours while being stirred at a temperature of 200° C. Further, a pressure in the reaction vessel was reduced to 8.3 kPa and maintained at the pressure for 1 hour. After that, the temperature was cooled to 180° C. and the pressure was returned to atmospheric pressure (first reaction step).

Trimellitic anhydride: 2.1 parts (6.0 mol % with respect to the total number of moles of the polyvalent carboxylic acids)

tert-Butylcatechol (polymerization inhibitor): 0.1 part

After that, the above-mentioned materials were loaded into the reaction vessel, and the pressure in the reaction vessel was reduced to 8.3 kPa. The mixture was subjected to a reaction for 15 hours while its temperature was maintained at 160° C. The fact that the softening point of the resultant measured in conformity with ASTM D36-86 reached a temperature of 140° C. was recognized, and then the temperature thereof was reduced to stop the reaction (second reaction step). Thus, an amorphous polyester resin B was obtained. The resultant amorphous polyester resin B had an outflow start temperature of 100° C. and a softening point of 143° C.

(Production Example of Amorphous Polyester Resin C)

Polyoxypropylene(2.2)-2,2-bis(4-hydroxyphenyl)propane: 73.9 parts (60.0 mol % with respect to the total number of moles of the polyhydric alcohols)

Polyoxyethylene(2.2)-2,2-bis(4-hydroxyphenyl)propane: 29.4 parts (40.0 mol % with respect to the total number of moles of the polyhydric alcohols)

Terephthalic acid: 24.0 parts (95.5 mol % with respect to the total number of moles of the polyvalent carboxylic acids)

Stearic acid: 2.7 parts (4.5 mol % with respect to the total number of moles of the polyvalent carboxylic acids)

Titanium tetrabutoxide (esterification catalyst): 0.5 part

The above-mentioned materials except stearic acid were weighed into a reaction vessel (flask) with a condenser, a stirrer, a nitrogen-introducing tube, and a thermocouple. Next, the inside of the flask was purged with a nitrogen gas, and then the temperature of the mixture was gradually increased while the mixture was stirred. The mixture was subjected to a reaction for 5 hours while being stirred at a temperature of 200° C. After that, stearic acid was added to the resultant, and the mixture was subjected to a reaction for 2 hours to provide an amorphous polyester resin C. The resultant amorphous polyester resin C had an outflow start temperature of 84° C. and a softening point of 104° C.

(Production Example of Resin Composition 1)

| | |
|---|---|
| Low-density polyethylene (Mw: 1,400, Mn: 850, peak temperature of a maximum endothermic peak obtained with a DSC: 100° C.) | 18 parts |
| Styrene | 66 parts |
| n-Butyl acrylate | 13.5 parts |
| Acrylonitrile | 2.5 parts |

The above-mentioned materials were loaded into an autoclave, and the inside of the system was purged with N2. After that, while the mixture was increased in temperature and stirred, the mixture was held at 180° C. Next, 50 parts of a 2 mass % solution of t-butyl hydroperoxide in xylene was continuously dropped into the system for 5 hours, and the mixture was cooled, followed by the separation and removal of the solvent. Thus, a resin composition 1 in which the vinyl resin components reacted with the above-mentioned low-density polyethylene was obtained. The measurement of the molecular weight of the resin composition 1 found that the composition had a weight-average molecular weight (Mw) of 7,100 and a number-average molecular weight (Mn) of 3,000. Further, a transmittance in a dispersion liquid obtained by dispersing the composition in a 45 vol % aqueous solution of methanol for light at a wavelength of 600 nm measured at a temperature of 25° C. was 69%.

[Production Example of Toner 1]

| | |
|---|---|
| Amorphous polyester resin A | 50.0 parts |
| Amorphous polyester resin B | 21.0 parts |
| Inorganic fine particles A | 10.0 parts |
| Fischer-Tropsch wax (peak temperature of a maximum endothermic peak: 90° C.) | 10.0 parts |
| Resin composition 1 | 3.6 parts |
| C.I. Pigment Blue 15:3 | 5.0 parts |
| Aluminum 3,5-di-t-butylsalicylate compound | 0.4 part |

Raw materials described in the above-mentioned formulation were mixed with a Henschel mixer (Model FM-75, manufactured by Nippon Coke & Engineering Co., Ltd.) at a number of revolutions of 20 $s^{-1}$ for a time of revolution of 5 minutes. After that, the mixture was kneaded with a twin-screw kneader (Model PCM-30, manufactured by Ikegai Corp.) set to a temperature of 125° C. The resultant kneaded product was cooled, and was coarsely pulverized with a hammer mill to a diameter of 1 mm or less to provide a coarsely pulverized product. The resultant coarsely pulverized product was finely pulverized with a mechanical pulverizer (T-250, manufactured by Freund-Turbo Corporation). Further, the finely pulverized product was classified with a rotary classifier (200TSP, manufactured by Hosokawa Micron Corporation) to provide toner particles. With regard to a condition for the operation of the rotary classifier (200TSP, manufactured by Hosokawa Micron Corporation), the classification was performed while the number of revolutions of its classification rotor was set to 50.0 $s^{-1}$.

Next, the toner particles were thermally treated with the heat treatment apparatus illustrated in FIGURE to provide toner particles 1. The apparatus was operated under the conditions of: a feeding amount of 5 kg/hr; a hot air temperature of 180° C.; a hot air flow rate of 6 $m^3$/min; a cold air temperature of −5° C.; a cold air flow rate of 4 $m^3$/min; a blower flow rate of 20 $m^3$/min; and an injection air flow rate of 1 $m^3$/min.

100 Parts of the toner particles 1 were mixed with 1.0 part of hydrophobic silica (BET: 200 $m^2$/g) and 1.0 part of titanium oxide fine particles subjected to surface treatment with isobutyltrimethoxysilane (BET: 80 $m^2/g$) through use of a Henschel mixer (Model FM-75, manufactured by Mitsui Mining Co., Ltd.) at a number of revolutions of 30 $s^{-1}$ for a time of revolution of 10 minutes to provide a toner 1. The physical properties of the resultant toner 1 are shown in Table 3.

[Production Examples of Toners 2 to 10 and 15 to 21]

Toners 2 to 10 and 15 to 21 were each obtained in the same manner as in the production example of the toner 1 except that the raw materials were changed as shown in Table 2. The physical properties of the resultant toners are shown in Table 3.

[Production Example of Toner 11]

| | |
|---|---|
| Production of Resin Fine Particle Dispersion Liquid: Tetrahydrofuran (manufactured by Wako Pure Chemical Industries, Ltd.) | 200 parts |
| Amorphous polyester resin A | 66 parts |
| Amorphous polyester resin B | 28 parts |
| Resin composition 1 | 4.7 parts |
| Aluminum 3,5-di-t-butylsalicylate compound | 0.5 part |
| Anionic surfactant (manufactured by DKS Co., Ltd.: NEOGEN RK) | 0.8 part |

The above-mentioned materials were mixed, and were then stirred for 12 hours so that the resins and the other components were dissolved and dispersed.

Next, 2.7 parts of N,N-dimethylaminoethanol was added to the resultant, and the mixture was stirred with an ultra-high-speed stirring apparatus T.K. ROBOMIX (manufactured by PRIMIX Corporation) at 4,000 rpm.

Further, 360 parts of ion-exchanged water was added to the above-mentioned mixed liquid at a rate of 1 g/min to deposit resin fine particles, and then tetrahydrofuran was removed with an evaporator. Thus, a resin fine particle dispersion liquid was obtained. The number-average particle diameter and solid content concentration of the resin fine particles in the resultant resin fine particle dispersion liquid were 0.11 μm and 21.7 mass %, respectively.

Production of Inorganic Fine Particle Dispersion Liquid:

| | |
|---|---|
| Inorganic fine particles A | 100 parts |
| Anionic surfactant (manufactured by DKS Co., Ltd.: NEOGEN RK) | 10 parts |
| Ion-exchanged water | 390 parts |

The above-mentioned materials were loaded into a mixing vessel with a stirring apparatus, and were then subjected to dispersion treatment for 20 minutes by being circulated in Clearmix W-Motion (manufactured by M Technique Co., Ltd.). Conditions for the dispersion treatment were set as described below.

Rotor outer diameter: 3 cm

Clearance: 0.3 mm

Number of revolutions of rotor: 19,000 r/min

Number of revolutions of screen: 19,000 r/min

The number-average particle diameter and solid content concentration of the inorganic fine particles A in the resultant inorganic fine particle dispersion liquid were 1.5 μm and 22.0 mass %, respectively.

Production of Colorant Dispersion Liquid:

| | |
|---|---|
| C.I. Pigment Blue 15:3 | 100 parts |
| Anionic surfactant | 10 parts |
| Ion-exchanged water | 890 parts |

The above-mentioned materials were mixed and dissolved, and were then dispersed with a high-pressure impact-type dispersing machine.

The number-average particle diameter and solid content concentration of the colorant particles in the resultant colorant dispersion liquid were 0.16 μm and 11.0 mass %, respectively.

Production of Wax Dispersion Liquid:

| | |
|---|---|
| Fischer-Tropsch wax (peak temperature of a maximum endothermic peak: 90° C.) | 100 parts |
| Anionic surfactant | 10 parts |
| Ion-exchanged water | 390 parts |

The above-mentioned materials were heated to 95° C., and were dispersed with a homogenizer. After that, the resultant was subjected to dispersion treatment with a pressure discharge-type dispersing machine "Gaulin Homogenizer" to provide a wax dispersion liquid. The number-average particle diameter and solid content concentration of the wax particles in the resultant wax dispersion liquid were 0.21 μm and 22.0 mass %, respectively.

(Aggregating and Fusing Step)

| | |
|---|---|
| Resin fine particle dispersion liquid | 345 parts |
| Inorganic fine particle dispersion liquid | 50 parts |
| Colorant dispersion liquid | 50 parts |
| Wax dispersion liquid | 50 parts |
| Ion-exchanged water | 400 parts |

The above-mentioned respective materials were loaded into a round flask made of stainless steel, and were mixed. After that, an aqueous solution obtained by dissolving 2 parts of magnesium sulfate in 98 parts of ion-exchanged water was added to the mixture, and the whole was dispersed with a homogenizer (manufactured by IKA: ULTRA-TURRAX T50) at 5,000 rpm for 10 minutes.

After that, the mixed liquid was heated to 58° C. in a water bath for heating with a stirring blade while the number of revolutions of the blade was appropriately regulated so that the liquid was stirred. The liquid was held at 58° C. for 1 hour to provide aggregated particles having a weight-average particle diameter of about 7.0 μm.

An aqueous solution obtained by dissolving 20 parts of trisodium citrate in 380 parts of ion-exchanged water was added to the dispersion liquid containing the aggregated particles, and then the mixture was heated to 85° C.

The mixture was held at 85° C. for 2 hours to provide an aqueous dispersion liquid of toner particles having a weight-average particle diameter of about 6.9 μm and an average circularity of 0.966.

After that, the aqueous dispersion liquid of the toner particles was cooled to 25° C., and was subjected to filtration and solid-liquid separation. After that, the filtrate was sufficiently washed with ion-exchanged water, and was dried with a vacuum dryer to provide toner particles 11 having a weight-average particle diameter of 6.8 μm.

100 Parts of the toner particles 11 were mixed with 1.0 part of hydrophobic silica (BET: 200 $m^2/g$) and 1.0 part of titanium oxide fine particles subjected to surface treatment with isobutyltrimethoxysilane (BET: 80 $m^2/g$) through use of a Henschel mixer (Model FM-75, manufactured by Mitsui Mining Co., Ltd.) at a number of revolutions of 30 s' for a time of revolution of 10 minutes to provide a toner 11. The physical properties of the resultant toner 11 are shown in Table 3.

[Production Example of Toner 12]

A toner 12 was produced by the following method through use of the various dispersion liquids produced in the production example of the toner 11.

(Aggregating and Fusing Step)

| | |
|---|---|
| Resin fine particle dispersion liquid | 245 parts |
| Inorganic fine particle dispersion liquid | 50 parts |
| Colorant dispersion liquid | 50 parts |
| Wax dispersion liquid | 25 parts |
| Ion-exchanged water | 400 parts |

The above-mentioned respective materials were loaded into a round flask made of stainless steel, and were mixed. After that, an aqueous solution obtained by dissolving 2 parts of magnesium sulfate in 98 parts of ion-exchanged water was added to the mixture, and the whole was dispersed with a homogenizer (manufactured by IKA: ULTRA-TURRAX T50) at 5,000 rpm for 10 minutes.

After that, the mixed liquid was heated to 58° C. in a water bath for heating with a stirring blade while the number of revolutions of the blade was appropriately regulated so that the liquid was stirred. The liquid was held at 50° C. for 1 hour to provide aggregated particles having a weight-average particle diameter of about 5.2 μm.

An aqueous solution obtained by dissolving 20 parts of trisodium citrate in 380 parts of ion-exchanged water was added to the dispersion liquid containing the aggregated particles, and then the mixture was heated to 85° C.

The mixture was held at 85° C. for 2 hours to provide fused particles (core particles) having a weight-average particle diameter of about 6.5 μm and an average circularity of 0.966.

The resultant aqueous dispersion liquid of the core particles was cooled to 25° C. while its stirring was maintained. First, 40 parts of a dispersion liquid obtained by stirring and mixing 100 parts of the resin fine particle dispersion liquid and 25 parts of the wax dispersion liquid in advance was added to the liquid, and the mixture was stirred under the condition of 25° C. for 10 minutes. Further, a 2 mass % aqueous solution of calcium chloride was slowly dropped into the mixture. Under the state, a small amount of the resultant liquid was sampled at any time, and was passed through a 2 μm microfilter. The stirring was continued at 25° C. until the filtrate became transparent.

After the recognition of the fact that the filtrate became transparent, 40 parts of the remaining dispersion liquid was added again to the liquid, and the stirring was continued. After the re-recognition of the fact that the filtrate became transparent, 45 parts of the finally remaining dispersion liquid was added again to the mixture, and the stirring was continued. After the recognition of the fact that the filtrate became transparent, the mixture was heated to 85° C. while the number of revolutions was appropriately adjusted. At that time, the particle diameters of the particles in the mixture were identified at any time, and when the particle diameters became larger, a 5 mass % aqueous solution of sodium ethylenediamine tetraacetate was added to prevent the advance of the aggregation of the particles.

The mixture was held at 85° C. for 1 hour to provide a dispersion liquid of toner particles (core-shell particle dispersion liquid) having a median diameter on a number basis of about 6.8 μm and an average circularity of 0.968.

After that, the aqueous dispersion liquid of the toner particles was cooled to 25° C., and was subjected to filtration and solid-liquid separation. After that, the filtrate was sufficiently washed with ion-exchanged water, and was dried with a vacuum dryer to provide toner particles 12 having a weight-average particle diameter of 6.7 μm.

100 Parts of the toner particles 12 were mixed with 1.0 part of hydrophobic silica (BET: 200 $m^2/g$) and 1.0 part of titanium oxide fine particles subjected to surface treatment with isobutyltrimethoxysilane (BET: 80 $m^2/g$) through use of a Henschel mixer (Model FM-75, manufactured by Mitsui Mining Co., Ltd.) at a number of revolutions of 30 s' for a time of revolution of 10 minutes to provide a toner 12. The physical properties of the resultant toner 12 are shown in Table 3.

[Production Example of Toner 13]

A toner 13 was produced by the following method through use of the various dispersion liquids produced in the production example of the toner 11.

(Aggregating and Fusing Step)

| | |
|---|---|
| Resin and compound composite dispersion liquid | 245 parts |
| Inorganic fine particle dispersion liquid | 50 parts |
| Colorant dispersion liquid | 50 parts |
| Wax dispersion liquid | 39 parts |
| Ion-exchanged water | 400 parts |

The above-mentioned respective materials were loaded into a round flask made of stainless steel, and were mixed. After that, an aqueous solution obtained by dissolving 2 parts of magnesium sulfate in 98 parts of ion-exchanged water was added to the mixture, and the whole was dispersed with a homogenizer (manufactured by IKA: ULTRA-TURRAX T50) at 5,000 rpm for 10 minutes.

After that, the mixed liquid was heated to 58° C. in a water bath for heating with a stirring blade while the number of revolutions of the blade was appropriately regulated so that the liquid was stirred. The liquid was held at 50° C. for 1 hour to provide aggregated particles having a weight-average particle diameter of about 5.2 μm.

An aqueous solution obtained by dissolving 20 parts of trisodium citrate in 380 parts of ion-exchanged water was added to the dispersion liquid containing the aggregated particles, and then the mixture was heated to 85° C.

The mixture was held at 85° C. for 2 hours to provide fused particles (core particles) having a weight-average particle diameter of about 6.6 μm and an average circularity of 0.966.

The resultant aqueous dispersion liquid of the core particles was cooled to 25° C. while its stirring was maintained. First, 40 parts of a dispersion liquid obtained by stirring and mixing 100 parts of the resin and compound composite dispersion liquid and 11 parts of the wax dispersion liquid in advance was added to the liquid, and the mixture was stirred under the condition of 25° C. for 10 minutes. Further, a 2 mass % aqueous solution of calcium chloride was slowly dropped into the mixture. Under the state, a small amount of the resultant liquid was sampled at any time, and was passed through a 2 μm microfilter. The stirring was continued at 25° C. until the filtrate became transparent.

After the recognition of the fact that the filtrate became transparent, 40 parts of the remaining dispersion liquid was added again to the liquid, and the stirring was continued. After the re-recognition of the fact that the filtrate became transparent, 45 parts of the finally remaining dispersion liquid was added again to the mixture, and the stirring was continued. After the recognition of the fact that the filtrate became transparent, the mixture was heated to 85° C. while the number of revolutions was appropriately adjusted. At that time, the particle diameters of the particles in the mixture were identified at any time, and when the particle diameters became larger, a 5 mass % aqueous solution of sodium ethylenediamine tetraacetate was added to prevent the advance of the aggregation of the particles.

The mixture was held at 85° C. for 1 hour to provide a dispersion liquid of toner particles (core-shell particle dispersion liquid) having a median diameter on a number basis of about 6.8 μm and an average circularity of 0.968.

After that, the aqueous dispersion liquid of the toner particles was cooled to 25° C., and was subjected to filtration and solid-liquid separation. After that, the filtrate was sufficiently washed with ion-exchanged water, and was dried with a vacuum dryer to provide toner particles 13 having a weight-average particle diameter of 6.7 μm.

100 Parts of the toner particles 13 were mixed with 1.0 part of hydrophobic silica (BET: 200 $m^2/g$) and 1.0 part of titanium oxide fine particles subjected to surface treatment with isobutyltrimethoxysilane (BET: 80 $m^2/g$) through use of a Henschel mixer (Model FM-75, manufactured by Mitsui Mining Co., Ltd.) at a number of revolutions of 30 s' for a time of revolution of 10 minutes to provide a toner 13. The physical properties of the resultant toner 13 are shown in Table 3.

[Production Example of Toner 14]

A toner 14 was produced by the following method through use of the various dispersion liquids produced in the production example of the toner 11.

(Aggregating and Fusing Step)

| | |
|---|---|
| Resin and compound composite dispersion liquid | 245 parts |
| Inorganic fine particle dispersion liquid | 50 parts |
| Colorant dispersion liquid | 50 parts |
| Wax dispersion liquid | 23 parts |
| Ion-exchanged water | 400 parts |

The above-mentioned respective materials were loaded into a round flask made of stainless steel, and were mixed. After that, an aqueous solution obtained by dissolving 2 parts of magnesium sulfate in 98 parts of ion-exchanged water was added to the mixture, and the whole was dispersed with a homogenizer (manufactured by IKA: ULTRA-TURRAX T50) at 5,000 rpm for 10 minutes.

After that, the mixed liquid was heated to 58° C. in a water bath for heating with a stirring blade while the number of revolutions of the blade was appropriately regulated so that the liquid was stirred. The liquid was held at 50° C. for 1 hour to provide aggregated particles having a weight-average particle diameter of about 5.2 μm.

An aqueous solution obtained by dissolving 20 parts of trisodium citrate in 380 parts of ion-exchanged water was added to the dispersion liquid containing the aggregated particles, and then the mixture was heated to 85° C.

The mixture was held at 85° C. for 2 hours to provide fused particles (core particles) having a weight-average particle diameter of about 6.5 μm and an average circularity of 0.966.

The resultant aqueous dispersion liquid of the core particles was cooled to 25° C. while its stirring was maintained. First, 40 parts of a dispersion liquid obtained by stirring and mixing 100 parts of the resin and compound composite dispersion liquid and 27 parts of the wax dispersion liquid in advance was added to the liquid, and the mixture was stirred under the condition of 25° C. for 10 minutes. Further, a 2 mass % aqueous solution of calcium chloride was slowly dropped into the mixture. Under the state, a small amount of the resultant liquid was sampled at any time, and was passed through a 2 μm microfilter. The stirring was continued at 25° C. until the filtrate became transparent.

After the recognition of the fact that the filtrate became transparent, 40 parts of the remaining dispersion liquid was added again to the liquid, and the stirring was continued. After the re-recognition of the fact that the filtrate became transparent, 45 parts of the finally remaining dispersion liquid was added again to the mixture, and the stirring was continued. After the recognition of the fact that the filtrate became transparent, the mixture was heated to 85° C. while the number of revolutions was appropriately adjusted. At that time, the particle diameters of the particles in the mixture were identified at any time, and when the particle diameters became larger, a 5 mass % aqueous solution of sodium ethylenediamine tetraacetate was added to prevent the advance of the aggregation of the particles.

The mixture was held at 85° C. for 1 hour to provide a dispersion liquid of toner particles (core-shell particle dispersion liquid) having a median diameter on a number basis of about 6.9 μm and an average circularity of 0.968.

After that, the aqueous dispersion liquid of the toner particles was cooled to 25° C., and was subjected to filtration and solid-liquid separation. After that, the filtrate was sufficiently washed with ion-exchanged water, and was dried with a vacuum dryer to provide toner particles 14 having a weight-average particle diameter of 6.8 μm.

100 Parts of the toner particles 14 were mixed with 1.0 part of hydrophobic silica (BET: 200 $m^2/g$) and 1.0 part of titanium oxide fine particles subjected to surface treatment with isobutyltrimethoxysilane (BET: 80 $m^2/g$) through use of a Henschel mixer (Model FM-75, manufactured by Mitsui Mining Co., Ltd.) at a number of revolutions of 30 s' for a time of revolution of 10 minutes to provide a toner 14. The physical properties of the resultant toner 14 are shown in Table 3.

TABLE 2

| | Resin | | | | Inorganic fine particles | | | Wax |
|---|---|---|---|---|---|---|---|---|
| Toner No. | Kind | Part(s) by mass | Kind | Part(s) by mass | Kind | Part(s) by mass | vol % | Part(s) by mass |
| 1 | Amorphous polyester resin A | 50.0 | Amorphous polyester resin B | 21.0 | Inorganic fine particles A | 10.0 | 4.0 | 10.0 |
| 2 | Amorphous polyester resin A | 50.0 | Amorphous polyester resin B | 21.0 | Inorganic fine particles B | 10.0 | 3.3 | 10.0 |
| 3 | Amorphous polyester resin A | 55.1 | Amorphous polyester resin B | 23.2 | Inorganic fine particles A | 2.7 | 1.0 | 10.0 |

TABLE 2-continued

| | | | | | | | | |
|---|---|---|---|---|---|---|---|---|
| 4 | Amorphous polyester resin A | 40.9 | Amorphous polyester resin B | 17.2 | Inorganic fine particles A | 22.9 | 10.0 | 10.0 |
| 5 | Amorphous polyester resin A | 55.6 | Amorphous polyester resin B | 23.3 | Inorganic fine particles A | 2.1 | 0.8 | 10.0 |
| 6 | Amorphous polyester resin A | 50.0 | Amorphous polyester resin B | 21.0 | Inorganic fine particles C | 10.0 | 4.0 | 10.0 |
| 7 | Amorphous polyester resin A | 50.0 | Amorphous polyester resin B | 21.0 | Inorganic fine particles D | 10.0 | 4.0 | 10.0 |
| 8 | Amorphous polyester resin A | 50.0 | Amorphous polyester resin B | 21.0 | Inorganic fine particles E | 10.0 | 4.0 | 10.0 |
| 9 | Amorphous polyester resin A | 50.0 | Amorphous polyester resin B | 21.0 | Inorganic fine particles F | 22.9 | 10.0 | 10.0 |
| 10 | Amorphous polyester resin A | 50.0 | Amorphous polyester resin B | 21.0 | Inorganic fine particles G | 27.8 | 12.6 | 10.0 |
| 11 | Amorphous polyester resin A | 50.0 | Amorphous polyester resin B | 21.0 | Inorganic fine particles A | 10.0 | 4.0 | 10.0 |
| 12 | Amorphous polyester resin A | 50.0 | Amorphous polyester resin B | 21.0 | Inorganic fine particles A | 10.0 | 4.0 | 10.0 |
| 13 | Amorphous polyester resin A | 50.0 | Amorphous polyester resin B | 21.0 | Inorganic fine particles A | 10.0 | 4.0 | 10.0 |
| 14 | Amorphous polyester resin A | 50.0 | Amorphous polyester resin B | 21.0 | Inorganic fine particles A | 10.0 | 4.0 | 10.0 |
| 15 | Amorphous polyester resin A | 55.0 | Amorphous polyester resin B | 23.0 | Inorganic fine particles A | 10.0 | 4.0 | 3.0 |
| 16 | Amorphous polyester resin A | 43.0 | Amorphous polyester resin B | 18.0 | Inorganic fine particles A | 10.0 | 4.0 | 20.0 |
| 17 | Amorphous polyester resin A | 50.0 | Amorphous polyester resin B | 21.0 | Inorganic fine particles H | 10.0 | 4.7 | 10.0 |
| 18 | Amorphous polyester resin A | 50.0 | Amorphous polyester resin B | 21.0 | Inorganic fine particles I | 10.0 | 4.7 | 10.0 |
| 19 | Amorphous polyester resin A | 55.6 | Amorphous polyester resin B | 23.4 | Inorganic fine particles A | 10.0 | 4.0 | 2.0 |
| 20 | Amorphous polyester resin A | 41.5 | Amorphous polyester resin B | 17.5 | Inorganic fine particles A | 10.0 | 4.0 | 22.0 |
| 21 | Amorphous polyester resin C | 57.0 | Amorphous polyester resin B | 24.0 | — | — | — | 10.0 |

| | Resin composition | Pigment | Compound | External additive (with respect to 100 parts by mass of toner particles) | | | |
|---|---|---|---|---|---|---|---|
| Toner No. | Part(s) by mass | Part(s) by mass | Part(s) by mass | Kind | Part(s) by mass | Kind | Part(s) by mass |
| 1 | 3.6 | 5.0 | 0.4 | Silica | 1.0 | Titanium oxide | 1.0 |
| 2 | 3.6 | 5.0 | 0.4 | Silica | 1.0 | Titanium oxide | 1.0 |
| 3 | 3.6 | 5.0 | 0.4 | Silica | 1.0 | Titanium oxide | 1.0 |
| 4 | 3.6 | 5.0 | 0.4 | Silica | 1.0 | Titanium oxide | 1.0 |
| 5 | 3.6 | 5.0 | 0.4 | Silica | 1.0 | Titanium oxide | 1.0 |
| 6 | 3.6 | 5.0 | 0.4 | Silica | 1.0 | Titanium oxide | 1.0 |
| 7 | 3.6 | 5.0 | 0.4 | Silica | 1.0 | Titanium oxide | 1.0 |

TABLE 2-continued

| | | | | | | | |
|---|---|---|---|---|---|---|---|
| 8 | 3.6 | 5.0 | 0.4 | Silica | 1.0 | Titanium oxide | 1.0 |
| 9 | 3.6 | 5.0 | 0.4 | Silica | 1.0 | Titanium oxide | 1.0 |
| 10 | 3.6 | 5.0 | 0.4 | Silica | 1.0 | Titanium oxide | 1.0 |
| 11 | 3.6 | 5.0 | 0.4 | Silica | 1.0 | Titanium oxide | 1.0 |
| 12 | 3.6 | 5.0 | 0.4 | Silica | 1.0 | Titanium oxide | 1.0 |
| 13 | 3.6 | 5.0 | 0.4 | Silica | 1.0 | Titanium oxide | 1.0 |
| 14 | 3.6 | 5.0 | 0.4 | Silica | 1.0 | Titanium oxide | 1.0 |
| 15 | 3.6 | 5.0 | 0.4 | Silica | 1.0 | Titanium oxide | 1.0 |
| 16 | 3.6 | 5.0 | 0.4 | Silica | 1.0 | Titanium oxide | 1.0 |
| 17 | 3.6 | 5.0 | 0.4 | Silica | 1.0 | Titanium oxide | 1.0 |
| 18 | 3.6 | 5.0 | 0.4 | Silica | 1.0 | Titanium oxide | 1.0 |
| 19 | 3.6 | 5.0 | 0.4 | Silica | 1.0 | Titanium oxide | 1.0 |
| 20 | 3.6 | 5.0 | 0.4 | Silica | 1.0 | Titanium oxide | 1.0 |
| 21 | 3.6 | 5.0 | 0.4 | Silica | 1.0 | Titanium oxide | 1.0 |

In the table, the term "Wax" represents the Fischer-Tropsch wax, the term "Resin composition" represents the resin composition 1, the term "Pigment" represents C.I. Pigment Blue 15:3, and the term "Compound" represents the aluminum 3,5-di-t-butylsalicylate compound. A value in the column "Part(s) by mass" for each of the constituent components for toner particles represents an amount per 100 parts by mass of the toner particles.

TABLE 3

| | Toner No. | Weight-average particle diameter D4 [μm] | Average circularity | Outflow start temperature T1 [° C.] | Softening point [° C.] | Ws/Wi | Number-average particle diameter of inorganic fine particles in toner [μm] |
|---|---|---|---|---|---|---|---|
| Example 1 | 1 | 6.8 | 0.966 | 85 | 106 | 1.5 | 1.5 |
| Example 2 | 2 | 6.8 | 0.966 | 85 | 106 | 1.5 | 1.3 |
| Example 3 | 3 | 6.8 | 0.966 | 85 | 106 | 1.5 | 1.5 |
| Example 4 | 4 | 6.8 | 0.966 | 85 | 107 | 1.5 | 1.5 |
| Example 5 | 5 | 6.8 | 0.966 | 85 | 106 | 1.5 | 1.5 |
| Example 6 | 6 | 6.8 | 0.966 | 85 | 107 | 1.5 | 0.5 |
| Example 7 | 7 | 6.8 | 0.966 | 85 | 106 | 1.5 | 2.0 |
| Example 8 | 8 | 6.8 | 0.965 | 85 | 108 | 1.5 | 0.1 |
| Example 9 | 9 | 6.8 | 0.966 | 85 | 106 | 1.5 | 3.0 |
| Example 10 | 10 | 6.8 | 0.966 | 85 | 106 | 1.5 | 3.2 |
| Example 11 | 11 | 6.8 | 0.965 | 85 | 106 | 1.0 | 1.5 |
| Example 12 | 12 | 6.7 | 0.965 | 85 | 106 | 2.0 | 1.5 |
| Example 13 | 13 | 6.7 | 0.965 | 85 | 106 | 0.8 | 1.5 |
| Example 14 | 14 | 6.8 | 0.965 | 85 | 106 | 2.2 | 1.5 |
| Example 15 | 15 | 6.8 | 0.965 | 85 | 108 | 1.5 | 1.5 |
| Example 16 | 16 | 6.8 | 0.967 | 85 | 104 | 1.5 | 1.5 |
| Example 17 | 17 | 6.8 | 0.966 | 85 | 106 | 1.5 | 1.5 |
| Comparative Example 1 | 18 | 6.8 | 0.966 | 85 | 106 | 1.5 | 1.5 |
| Comparative Example 2 | 19 | 6.8 | 0.965 | 85 | 109 | 1.5 | 1.5 |
| Comparative Example 3 | 20 | 6.8 | 0.967 | 85 | 103 | 1.5 | 1.5 |
| Comparative Example 4 | 21 | 6.8 | 0.964 | 87 | 110 | 1.5 | — |

[Production Example of Carrier]

(Production Example of Magnetic Core Particles 1)

Step 1 (Weighing/mixing Step):

| | |
|---|---|
| $Fe_2O_3$ | 62.7 parts |
| $MnCO_3$ | 29.5 parts |

-continued

| | |
|---|---|
| $Mg(OH)_2$ | 6.8 parts |
| $SrCO_3$ | 1.0 part |

The above-mentioned ferrite raw materials were weighed so that the above-mentioned composition ratio was obtained. After that, the materials were pulverized and mixed with a dry vibrating mill using stainless-steel beads each having a diameter of ⅛ inch for 5 hours.

Step 2 (Pre-Calcining Step):

The resultant pulverized product was turned into a square pellet about 1 mm on a side with a roller compactor. Coarse powder was removed from the pellet with a vibrating sieve having an aperture of 3 mm, and then fine powder was removed with a vibrating sieve having an aperture of 0.5 mm. After that, the residue was calcined with a burner-type calcining furnace under a nitrogen atmosphere (oxygen concentration: 0.01 vol %) at a temperature of 1,000° C. for 4 hours to produce pre-calcined ferrite. The composition of the resultant pre-calcined ferrite is as described below:

$$(MnO)_a(MgO)_b(SrO)_c(Fe_2O_3)_d$$

in the formula, a=0.257, b=0.117, c=0.007, and d=0.393.

Step 3 (Pulverizing Step):

The pre-calcined ferrite was pulverized with a crusher to a diameter of about 0.3 mm, and then 30 parts of water was added to 100 parts of the pre-calcined ferrite, followed by the pulverization of the mixture with a wet ball mill using zirconia beads each having a diameter of ⅛ inch for 1 hour. The resultant slurry was pulverized with a wet ball mill using alumina beads each having a diameter of 1/16 inch for 4 hours to provide a ferrite slurry (finely pulverized product of the pre-calcined ferrite).

Step 4 (Granulating Step):

1.0 Part of ammonium polycarboxylate serving as a dispersant and 2.0 parts of polyvinyl alcohol serving as a binder with respect to 100 parts of the pre-calcined ferrite were added to the ferrite slurry, and the mixture was granulated into spherical particles with a spray dryer (manufacturer: Ohkawara Kakohki Co., Ltd.). The particle sizes of the resultant particles were adjusted, and then their organic components, that is, the dispersant and the binder were removed by heating the particles with a rotary kiln at 650° C. for 2 hours.

Step 5 (Calcining Step):

To control a calcining atmosphere, the temperature of the residue was increased from room temperature to a temperature of 1,300° C. over 2 hours with an electric furnace under a nitrogen atmosphere (oxygen concentration: 1.00 vol %), followed by the calcination thereof at a temperature of 1,150° C. for 4 hours. After that, the temperature of the resultant was decreased to 60° C. over 4 hours, and the surrounding atmosphere thereof was returned from the nitrogen atmosphere to the air, followed by the removal thereof at a temperature of 40° C. or less.

Step 6 (Sorting Step):

After aggregated particles had been shredded, a low-magnetic force product was discarded by magnetic separation, and coarse particles were removed by sieving the residue with a sieve having an aperture of 250 μm. Thus, magnetic core particles 1 having a 50% particle diameter (D50) on a volume distribution basis of 37.0 μm were obtained.

(Preparation of Coating Resin 1)

| | |
|---|---|
| Cyclohexyl methacrylate monomer | 26.8 mass % |
| Methyl methacrylate monomer | 0.2 mass % |
| Methyl methacrylate macromonomer (Macromonomer having a weight-average molecular weight of 5,000, the macromonomer having a methacryloyl group at one terminal thereof) | 8.4 mass % |
| Toluene | 31.3 mass % |
| Methyl ethyl ketone | 31.3 mass % |
| Azobisisobutyronitrile | 2.0 mass % |

Of the above-mentioned materials, cyclohexyl methacrylate, methyl methacrylate, the methyl methacrylate macromonomer, toluene, and methyl ethyl ketone were added to a four-necked separable flask mounted with a reflux condenser, a temperature gauge, a nitrogen-introducing tube, and a stirring device, and a nitrogen gas was introduced into the flask to sufficiently establish a nitrogen atmosphere. After that, the mixture was warmed to 80° C., azobisisobutyronitrile was added to the mixture, and the whole was refluxed and polymerized for 5 hours. Hexane was injected into the resultant reaction product to precipitate and deposit a copolymer, and the precipitate was separated by filtration. After that, the precipitate was dried in a vacuum to provide a coating resin 1. 30 Parts of the resultant coating resin 1 was dissolved in 40 parts of toluene and 30 parts of methyl ethyl ketone to provide a polymer solution 1 (solid content: 30 mass %).

(Preparation of Coating Resin Solution 1)

| | |
|---|---|
| Polymer solution 1 (resin solid content concentration: 30 mass %) | 33.3 mass % |
| Toluene | 66.4 mass % |
| Carbon black (Regal 330; manufactured by Cabot Corporation) (Primary particle diameter: 25 nm, nitrogen adsorption specific surface area: 94 $m^2/g$, DBP oil absorption: 75 mL/100 g) | 0.3 mass % |

The above-mentioned materials were dispersed with a paint shaker using zirconia beads each having a diameter of 0.5 mm for 1 hour. The resultant dispersion liquid was filtered with a 5.0 μm membrane filter to provide a coating resin solution 1.

[Production Example of Magnetic Carrier 1]

(Resin Coating Step):

The coating resin solution 1 was loaded into a vacuum degassing-type kneader maintained at normal temperature so that its amount in terms of resin component became 2.5 parts with respect to 100 parts of the magnetic core particles 1. After the loading, the mixture was stirred at a number of revolutions of 30 rpm for 15 minutes. After the volatilization of a certain amount (80 mass %) or more of the solvent, while the contents were mixed under reduced pressure, their temperature was increased to 80° C., and toluene was evaporated over 2 hours, followed by cooling. A low-magnetic force product was separated from the resultant magnetic carrier by magnetic separation, and the residue was passed through a sieve having an aperture of 70 After that, the resultant was classified with an air classifier to provide a magnetic carrier 1 having a 50% particle diameter (D50) on a volume distribution basis of 38.2 μm.

[Production Example of Two-component Developer 1]

8.0 Parts of the toner 1 was added to 92.0 parts of the magnetic carrier 1, and the contents were mixed with a V-type mixer (V-20 manufactured by Seishin Enterprise Co., Ltd.) to provide a two-component developer 1.

[Production Examples of Two-component Developers 2 to 21]

Two-component developers 2 to 21 were obtained by performing production in the same manner as in the production example of the two-component developer 1 except that the toner was changed as shown in Table 4.

Examples 1 to 17

The following evaluations were performed with the toners 1 to 17 (two-component developers 1 to 17).

Comparative Examples 1 to 4

The following evaluations were performed with the toners 18 to 21 (two-component developers 18 to 21).

TABLE 4

| | Toner No. | Carrier No. | Two-component developer No. |
|---|---|---|---|
| Example 1 | Toner 1 | Carrier 1 | Two-component developer 1 |
| Example 2 | Toner 2 | Carrier 1 | Two-component developer 2 |
| Example 3 | Toner 3 | Carrier 1 | Two-component developer 3 |
| Example 4 | Toner 4 | Carrier 1 | Two-component developer 4 |
| Example 5 | Toner 5 | Carrier 1 | Two-component developer 5 |
| Example 6 | Toner 6 | Carrier 1 | Two-component developer 6 |
| Example 7 | Toner 7 | Carrier 1 | Two-component developer 7 |
| Example 8 | Toner 8 | Carrier 1 | Two-component developer 8 |
| Example 9 | Toner 9 | Carrier 1 | Two-component developer 9 |
| Example 10 | Toner 10 | Carrier 1 | Two-component developer 10 |
| Example 11 | Toner 11 | Carrier 1 | Two-component developer 11 |
| Example 12 | Toner 12 | Carrier 1 | Two-component developer 12 |
| Example 13 | Toner 13 | Carrier 1 | Two-component developer 13 |
| Example 14 | Toner 14 | Carrier 1 | Two-component developer 14 |
| Example 15 | Toner 15 | Carrier 1 | Two-component developer 15 |
| Example 16 | Toner 16 | Carrier 1 | Two-component developer 16 |
| Example 17 | Toner 17 | Carrier 1 | Two-component developer 17 |
| Comparative Example 1 | Toner 18 | Carrier 1 | Two-component developer 18 |
| Comparative Example 2 | Toner 19 | Carrier 1 | Two-component developer 19 |
| Comparative Example 3 | Toner 20 | Carrier 1 | Two-component developer 20 |
| Comparative Example 4 | Toner 21 | Carrier 1 | Two-component developer 21 |

[Toner Characteristic Evaluation]

Evaluations to be described later were performed with the two-component developers 1 to 21. The results are shown in Table 5.

<Scratch Resistance>

A full-color copying machine imagePress C10000VP manufactured by Canon Inc. was used as an image-forming apparatus, and the two-component developers 1 to 21 were each loaded into the developing unit of its cyan station and evaluated for scratch resistance.

The evaluation was performed under a normal-temperature and normal-humidity environment (23° C./50% RH), and OK Top Coat+ (128.0 g/$m^2$) was used as evaluation paper.

A 10 $cm^2$ halftone image having a reflection density of 0.15 was output as an evaluation image.

The scratch resistance evaluation was performed by the following method.

First, a load of 0.2 kgf/$cm^2$ was applied to a portion having printed thereon the halftone image, and the fixed image was rubbed (back and forth 10 times) with the above-mentioned coated paper serving as white paper.

The average reflectance Ds (%) of the white portion of the above-mentioned coated paper was measured with a reflectometer (REFLECTOMETER MODEL TC-6DS: manufactured by Tokyo Denshoku Co., Ltd.).

Next, the average reflectance Dr (%) of the rubbed portion of the above-mentioned coated paper used in the rubbing was measured. Then, a reflectance reduction width (%) was calculated by using the following equation. The resultant reflectance reduction width was evaluated in accordance with the following evaluation criteria. A rank of C or more was judged to be satisfactory.

$$\text{Fogging } (\%) = Ds\ (\%) - Dr\ (\%)$$

(Evaluation Criteria)

A: Less than 2.0%

B: 2.0% or more and less than 5.0%

C: 5.0% or more and less than 8.0%

D: 8.0% or more

<Method of Evaluating Low-Temperature Fixability>

A full-color copying machine imagePress C10000VP manufactured by Canon Inc. was used as an image-forming apparatus, and the two-component developers 1 to 21 were each loaded into the developing unit of its cyan station and evaluated for low-temperature fixability.

An unfixed image was output with a reconstructed machine obtained by removing a fixing unit from the above-mentioned copying machine.

A fixation test was performed with the fixing unit that was removed from the above-mentioned copying machine and reconstructed so that its fixation temperature was able to be regulated. A specific evaluation method is as described below.

Paper: OK Top 128 (128 g/$m^2$)

Toner laid-on level: 1.20 mg/$cm^2$

Fixation test environment: Low-temperature and low-humidity environment (15° C./10% RH)

After the production of the above-mentioned unfixed image, the image was fixed by setting the process speed and fixation temperature of the fixing unit to 450 mm/sec and 130° C., respectively. The image density reduction ratio of the resultant image was measured, and was used as an indicator for the low-temperature fixability evaluation. The image density reduction ratio was determined as described below. First, the image density of the central portion of the image was measured with an X-Rite color reflection densitometer (500 Series: manufactured by X-Rite, Inc.). Next, a load of 4.9 kPa (50 g/$cm^2$) was applied to the portion whose image density had been measured, and the fixed image was rubbed (back and forth 5 times) with lens-cleaning paper, followed by the measurement of its image density again. Then, the ratio (%) at which the image density reduced after the rubbing as compared to that before the rubbing was measured. A rank of D or more was judged to be satisfactory.

(Evaluation Criteria)

A: The density reduction ratio is less than 1.0%.

B: The density reduction ratio is 1.0% or more and less than 5.0%.

C: The density reduction ratio is 5.0% or more and less than 10.0%.

D: The density reduction ratio is 10.0% or more and less than 15.0%.

E: The density reduction ratio is 15.0% or more.

<Method of Evaluating Fixation Separability>

An unfixed image measuring 2 cm by 20 cm and having a toner laid-on level of 0.08 mg/$cm^2$ was produced at the long edge of paper in its paper passing direction with the above-mentioned reconstructed copying machine while a margin of 2.0 mm was arranged at the top edge portion of the paper.

Next, the above-mentioned unfixed image was fixed with the reconstructed fixing machine at a process speed of 450 mm/sec while its fixation temperature was increased from 140° C. in increments of 5° C. The highest fixation temperature at which no separation failure occurred was used in a fixation separability evaluation. A test environment was a normal-temperature and low-humidity environment (23° C./5% RH).

A4 size CS-064 paper (manufactured by Canon Inc., 64 $g/m^2$) was used as a transfer material for the fixed image. Evaluation criteria are as described below. A rank of D or more was judged to be satisfactory.

(Evaluation Criteria)

A: 190° C. or more

B: 180° C. or more and less than 190° C.

C: 170° C. or more and less than 180° C.

D: 160° C. or more and less than 170° C.

E: Less than 160° C.

<Method of Evaluating Coloring Power>

A reconstructed machine of a full-color copying machine imageRUNNER ADVANCE C5255 manufactured by Canon Inc. was used as an image-forming apparatus, and the two-component developers 1 to 21 were each loaded into the developing unit of its cyan station and evaluated for coloring power.

The evaluation was performed under a normal-temperature and normal-humidity environment (23° C., 50% RH), and plain paper for copying "GF-0081" (A4, basis weight: 81.4 $g/m^2$, sold from Canon Marketing Japan Inc.) was used as evaluation paper.

First, in the evaluation environment, a relationship between an image density and a toner laid-on level on the paper was examined by changing the toner laid-on level on the paper.

Next, such adjustment that the image density of an FFH image (solid portion) became 1.40 was performed, and the toner laid-on level when the image density became 1.40 was determined.

The term "FFH image" refers to a value obtained by representing 256 gray levels in hexadecimal notation, and the symbol "OOH" represents the first gray level (white portion) while the symbol "FFH" represents the 256th gray level (solid portion).

The image density was measured with an X-Rite color reflection densitometer (500 Series: manufactured by X-Rite, Inc.).

The coloring power of each of the toners was evaluated from the toner laid-on level ($mg/cm^2$) by the following criteria. A rank of C or more was judged to be satisfactory.

(Evaluation Criteria)

A: Less than 0.35 $mg/cm^2$

B: 0.35 $mg/cm^2$ or more and less than 0.50 $mg/cm^2$

C: 0.50 $mg/cm^2$ or more and less than 0.65 $mg/cm^2$

D: 0.65 $mg/cm^2$ or more

<Transferability Evaluation>

A transferability evaluation was performed with each of the two-component developers 1 to 21.

Paper: GF-0081 (81.0 $g/m^2$) (Canon Marketing Japan Inc.)

Toner laid-on level in a solid image: 0.35 $mg/cm^2$

Primary transfer current: 30 μA

Test environment: Normal-temperature and normal-humidity environment (at a temperature of 23° C. and a humidity of 50% RH)

Process speed: 377 mm/sec

Each of the two-component developers to be evaluated was loaded into the cyan developing unit of an image-forming apparatus (commercially available full-color digital copying machine (CLC1100, manufactured by Canon Inc.)), and was subjected to an evaluation to be described later.

The toner remaining on the photosensitive member of the apparatus after its primary transfer and the toner before the primary transfer were each peeled off through taping with a transparent adhesive tape made of polyester. The adhesive tape that had been peeled off was bonded onto the paper, and its density was measured with a spectral densitometer "500 Series" (X-Rite, Inc.).

Transfer efficiency was determined from the expression "(density before primary transfer-transfer residual density)/density before primary transfer×100," and was evaluated based on the following evaluation criteria. A rank of C or more was judged to be satisfactory.

A: The transfer efficiency is 90% or more.

B: The transfer efficiency is 85% or more and less than 90%.

C: The transfer efficiency is 80% or more and less than 85%.

D: The transfer efficiency is less than 80%.

TABLE 5

| | Scratch resistance | | Low-temperature fixability | | Fixation separability | | Coloring power | | Transferability | |
|---|---|---|---|---|---|---|---|---|---|---|
| | Reflectance reduction width (%) | Rank | Density reduction ratio (%) | Rank | Temperature (° C.) | Rank | Laid-on level ($mg/cm^3$) | Rank | Efficiency (%) | Rank |
| Example 1 | 4.5 | B | 3.1 | B | 185 | B | 0.38 | B | 91 | A |
| Example 2 | 4.2 | B | 2.9 | B | 185 | B | 0.40 | B | 92 | A |
| Example 3 | 6.5 | C | 6.8 | C | 175 | C | 0.35 | A | 95 | A |
| Example 4 | 1.9 | A | 0.9 | A | 200 | A | 0.58 | C | 82 | C |
| Example 5 | 7.0 | C | 12.9 | D | 170 | C | 0.34 | A | 96 | A |
| Example 6 | 6.0 | C | 7.7 | C | 170 | C | 0.35 | A | 92 | A |
| Example 7 | 4.8 | B | 1.8 | B | 185 | B | 0.41 | B | 88 | B |
| Example 8 | 7.8 | C | 8.9 | C | 165 | D | 0.34 | A | 93 | A |
| Example 9 | 1.9 | A | 0.9 | A | 200 | A | 0.61 | C | 85 | C |
| Example 10 | 1.8 | A | 0.8 | A | 205 | A | 0.63 | C | 82 | C |
| Example 11 | 6.9 | C | 3.0 | B | 175 | C | 0.38 | B | 92 | A |
| Example 12 | 1.9 | A | 3.1 | B | 190 | A | 0.39 | B | 86 | B |
| Example 13 | 7.2 | C | 3.5 | B | 165 | D | 0.38 | B | 93 | A |
| Example 14 | 1.8 | A | 2.9 | B | 195 | A | 0.40 | B | 81 | C |
| Example 15 | 7.8 | C | 8.1 | C | 160 | D | 0.37 | B | 95 | A |
| Example 16 | 1.7 | A | 0.8 | A | 195 | A | 0.40 | B | 80 | C |

TABLE 5-continued

| | Scratch resistance | | Low-temperature fixability | | | | Coloring power | | | |
|---|---|---|---|---|---|---|---|---|---|---|
| | Reflectance | | Density | | Fixation separability | | Laid-on | | Transferability | |
| | reduction width (%) | Rank | reduction ratio (%) | Rank | Temperature (° C.) | Rank | level ($mg/cm^3$) | Rank | Efficiency (%) | Rank |
| Example 17 | 7.8 | C | 3.0 | B | 170 | C | 0.37 | B | 90 | A |
| Comparative Example 1 | 9.2 | D | 3.2 | B | 165 | D | 0.37 | B | 90 | A |
| Comparative Example 2 | 8.8 | D | 13.3 | D | 150 | E | 0.36 | B | 96 | A |
| Comparative Example 3 | 1.6 | A | 0.8 | A | 200 | A | 0.42 | B | 78 | D |
| Comparative Example 4 | 2.0 | B | 20.0 | E | 175 | C | 0.33 | A | 92 | A |

The scratch resistance of the toner of Comparative Example 1 was evaluated as D. The inorganic fine particles I had a thermal expansion coefficient of 0.0 ($10^{-6}$/K), and were hence free of negative thermal expansivity. Probably because of the foregoing, the exudation of the wax of the toner could not be accelerated at the time of the fixation of the evaluation image, and hence the friction coefficient of the surface of the image became higher. Probably because of the foregoing, the toner did not show any effect on the scratch resistance.

The fixation separability of the toner of Comparative Example 2 was evaluated as E. This is probably because the amount of the wax in the toner particles was as small as 2.0 parts, and hence the amount of the wax exuding to the surface of the image at the time of its fixation reduced. Probably because of the foregoing, the toner did not show any effect on the fixation separability.

The transferability of the toner of Comparative Example 3 was evaluated as D. This is probably because the amount of the wax in the toner particles was as large as 22.0 parts, and hence the amount of the wax occupying the surfaces of the toner particles increased to cause charging unevenness, to thereby raise the adhesive force of the toner. Probably because of the foregoing, the toner did not show any effect on the transferability.

The low-temperature fixability of the toner of Comparative Example 4 was evaluated as E. No negatively thermally expansive inorganic fine particles were internally added, and the viscosities of the amorphous resins were increased for improving the scratch resistance of the toner. Probably because of the foregoing, a temperature required for the fixation thereof became higher. Accordingly, the toner did not show any effect on the low-temperature fixability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082700, filed May 20, 2022, and Japanese Patent Application No. 2023-037322, filed Mar. 10, 2023, which are hereby incorporated by reference herein in their entirety.

What is claimed is:

1. A toner, comprising:

a toner particle containing a binder resin, a wax and an inorganic fine particle;

the inorganic fine particle having a number-average particle diameter of 1.3 to 2.0 μm;

a content of the wax being 3.0 to 20.0 mass % with respect to a mass of the toner particle;

the inorganic fine particle comprising a zirconium phosphate tungstate particle or a zirconium phosphate particle; and a content of the inorganic fine particle in the toner particle being 3.3 to 8.0 vol % with respect to the toner particle, wherein when an outflow start temperature measured with the toner is represented by T1(° C.), the inorganic fine particle always has a thermal expansion coefficient of $-0.1\times10^{-6}$ (/K) or less in a temperature range of 30° C. to T1° C., the thermal expansion coefficient being determined by X-ray diffraction, and $2.0\geq Ws/Wi\geq 1.0$ when Ws is an area proportion of the wax in a region from a surface of the toner particle to a depth of 500 nm in observation of a section of the toner particle with a transmission electron microscope, and Wi is an area proportion of the wax in a region inside the depth of 500 nm.

2. The toner according to claim 1, wherein the inorganic fine particle is zirconium phosphate having negative thermal expansivity.

* * * * *